US011435553B2

(12) United States Patent
Lin et al.

(10) Patent No.: US 11,435,553 B2
(45) Date of Patent: Sep. 6, 2022

(54) OPTICAL IMAGING LENS

(71) Applicant: GENIUS ELECTRONIC OPTICAL (XIAMEN) CO., LTD., Fujian (CN)

(72) Inventors: Maozong Lin, Fujian (CN); Run Hu, Fujian (CN); Zhao Wang, Fujian (CN)

(73) Assignee: GENIUS ELECTRONIC OPTICAL (XIAMEN) CO., LTD., Fujian (CN)

(*) Notice: Subject to any disclaimer, the term of this patent is extended or adjusted under 35 U.S.C. 154(b) by 388 days.

(21) Appl. No.: 16/721,926

(22) Filed: Dec. 20, 2019

(65) Prior Publication Data
US 2021/0132334 A1 May 6, 2021

(30) Foreign Application Priority Data
Oct. 30, 2019 (CN) .......................... 201911043756.3

(51) Int. Cl.
G02B 9/60 (2006.01)
G02B 13/00 (2006.01)
G02B 27/00 (2006.01)
G02B 3/02 (2006.01)

(52) U.S. Cl.
CPC ............ *G02B 9/60* (2013.01); *G02B 13/002* (2013.01); *G02B 27/005* (2013.01); *G02B 3/02* (2013.01)

(58) Field of Classification Search
CPC ..... G02B 13/0045; G02B 13/005; G02B 9/60
USPC ........................ 359/763, 770, 714
See application file for complete search history.

(56) References Cited

U.S. PATENT DOCUMENTS

| 8,649,113 | B1* | 2/2014 | Tsai ................... | G02B 13/0045 |
| | | | | 359/740 |
| 8,908,288 | B2* | 12/2014 | Hsu .................... | G02B 13/0045 |
| | | | | 359/767 |
| 9,423,593 | B2* | 8/2016 | Jung ................... | G02B 13/0045 |
| 9,817,213 | B2 | 11/2017 | Mercado | |
| 10,088,652 | B2* | 10/2018 | Jeon ................... | G02B 13/0045 |
| 10,107,990 | B2* | 10/2018 | Chen .................. | G02B 13/0045 |
| 10,209,488 | B2* | 2/2019 | Tseng ................. | G02B 13/0045 |
| 10,247,911 | B2* | 4/2019 | Chen ........................ | G02B 9/60 |
| 10,509,203 | B2* | 12/2019 | Lee .................... | G02B 13/0045 |
| 10,564,396 | B2* | 2/2020 | Tsai ......................... | G02B 9/60 |
| 10,656,382 | B2* | 5/2020 | Hsu .......................... | G02B 9/60 |
| 10,788,648 | B2* | 9/2020 | Liao ....................... | G02B 7/021 |
| 10,942,338 | B2* | 3/2021 | Yamazaki ............... | G02B 9/60 |
| 11,016,269 | B2* | 5/2021 | Zhao .................. | G02B 13/0045 |

(Continued)

FOREIGN PATENT DOCUMENTS

| CN | 208156286 | | 11/2018 | | |
| CN | 111025536 | A * | 4/2020 | ......... | G02B 13/0045 |
| TW | I662315 | | 6/2019 | | |

OTHER PUBLICATIONS

"Office Action of Taiwan Counterpart Application", dated Jun. 29, 2020, p. 1-p. 12.

*Primary Examiner* — Zachary W Wilkes
(74) *Attorney, Agent, or Firm* — JCIPRNET

(57) ABSTRACT

An optical imaging lens is provided, sequentially including a first lens element, an aperture, a second lens element, a third lens element, a fourth lens element, and a fifth lens element from an object side to an image side along an optical axis. The optical imaging lens satisfies conditional expressions $V2+V3+V4+V5 \leq 170.000$ and $(T2+T4)/(T1+G12) \geq 2.900$. Furthermore, other optical imaging lenses are also provided.

19 Claims, 33 Drawing Sheets

(56) References Cited

U.S. PATENT DOCUMENTS

| | | | |
|---|---|---|---|
| 2015/0103225 A1* | 4/2015 | Hsu | G02B 9/60 |
| | | | 348/335 |
| 2017/0123185 A1* | 5/2017 | Choi | G02B 9/60 |
| 2020/0192061 A1* | 6/2020 | Liao | G02B 27/0025 |
| 2020/0292790 A1* | 9/2020 | Jung | G02B 21/36 |
| 2021/0033823 A1* | 2/2021 | Li | G02B 13/0045 |
| 2021/0048639 A1* | 2/2021 | Li | G02B 13/0045 |
| 2021/0124152 A1* | 4/2021 | Xiao | G02B 13/0045 |

\* cited by examiner

| First embodiment ||||||
|---|---|---|---|---|---|
| Effective focus length (EFL) = 1.791 mm, half field of view (HFOV) = 48.675°, total track length (TTL) = 3.727 mm, F-number (Fno) = 2.561, and image height (ImgH) = 2.297 mm. ||||||
| Element | Surface | Curvature radius (mm) | Thickness (mm) | Refractive index | Abbe number | Focal length (mm) |
| Object | | Infinite | Infinite | | | |
| First lens element 1 | Object-side surface 15 | -2.889 | 0.246 | 1.535 | 55.690 | -5.512 |
| | Image-side surface 16 | -128.668 | 0.219 | | | |
| Aperture 0 | | Infinite | 0.007 | | | |
| Second lens element 2 | Object-side surface 25 | 1.927 | 0.645 | 1.535 | 55.690 | 1.576 |
| | Image-side surface 26 | -1.330 | 0.101 | | | |
| Third lens element 3 | Object-side surface 35 | 4.147 | 0.277 | 1.661 | 20.373 | -5.254 |
| | Image-side surface 36 | 1.849 | 0.153 | | | |
| Fourth lens element 4 | Object-side surface 45 | -2.424 | 0.838 | 1.535 | 55.690 | 1.343 |
| | Image-side surface 46 | -0.623 | 0.140 | | | |
| Fifth lens element 5 | Object-side surface 55 | 2.926 | 0.369 | 1.567 | 37.490 | -1.401 |
| | Image-side surface 56 | 0.599 | 0.450 | | | |
| Filter 9 | Object-side surface 95 | Infinite | 0.210 | 1.517 | 64.167 | |
| | Image-side surface 96 | Infinite | 0.071 | | | |
| | Image plane 99 | Infinite | | | | |

FIG. 8

| Surface | K | $a_2$ | $a_4$ | $a_6$ | $a_8$ |
|---|---|---|---|---|---|
| 15 | 0.000000E+00 | 0.000000E+00 | 6.448941E-01 | -8.186037E-01 | 3.253530E-01 |
| 16 | 6.262254E+04 | 0.000000E+00 | 1.090975E+00 | -2.624921E+00 | 1.818873E+01 |
| 25 | 0.000000E+00 | 0.000000E+00 | 1.348056E-01 | 3.324457E-01 | -2.410315E+01 |
| 26 | 0.000000E+00 | 0.000000E+00 | -9.241983E-01 | 3.891668E+00 | -1.642569E+01 |
| 35 | 0.000000E+00 | 0.000000E+00 | -1.276564E+00 | 2.806262E+00 | -7.294097E+00 |
| 36 | 0.000000E+00 | 0.000000E+00 | -3.832051E-01 | -3.108750E-01 | 3.487441E+00 |
| 45 | 0.000000E+00 | 0.000000E+00 | 3.565532E-01 | -3.071064E-02 | -5.246903E+00 |
| 46 | -9.710450E-01 | 0.000000E+00 | 9.401620E-01 | -3.092201E+00 | 9.895264E+00 |
| 55 | 0.000000E+00 | 0.000000E+00 | -3.544953E-01 | 1.954859E-01 | -8.267389E-01 |
| 56 | -4.775458E+00 | 0.000000E+00 | -9.068523E-02 | -8.447638E-02 | 1.906279E-01 |
| Surface | $a_{10}$ | $a_{12}$ | $a_{14}$ | $a_{16}$ | $a_{18}$ |
| 15 | 5.147975E+00 | -1.956850E+01 | 3.071061E+01 | -1.835587E+01 | |
| 16 | -5.325844E+01 | -4.654080E+01 | 7.589997E+02 | -1.311250E+03 | |
| 25 | 3.285455E+02 | -2.233264E+03 | 7.611513E+03 | -1.042650E+04 | |
| 26 | 7.313902E+01 | -2.526028E+02 | 4.992120E+02 | -4.128217E+02 | |
| 35 | 3.447210E+01 | -1.289822E+02 | 2.449627E+02 | -1.806835E+02 | |
| 36 | -6.730957E+00 | 2.372437E+00 | 7.606105E+00 | -7.118235E+00 | |
| 45 | 3.115697E+01 | -8.741558E+01 | 1.453500E+02 | -1.459386E+02 | 8.143440E+01 |
| 46 | -2.535091E+01 | 4.587731E+01 | -5.401189E+01 | 3.952449E+01 | -1.615444E+01 |
| 55 | 1.556757E+00 | -1.466861E+00 | 6.609177E-01 | -8.606465E-02 | -2.738135E-02 |
| 56 | -1.821195E-01 | 1.057156E-01 | -3.947475E-02 | 9.313442E-03 | -1.261767E-03 |
| Surface | $a_{20}$ | | | | |
| 15 | | | | | |
| 16 | | | | | |
| 25 | | | | | |
| 26 | | | | | |
| 35 | | | | | |
| 36 | | | | | |
| 45 | -1.945685E+01 | | | | |
| 46 | 2.845986E+00 | | | | |
| 55 | 1.016260E-02 | | | | |
| 56 | 7.435029E-05 | | | | |

FIG. 9

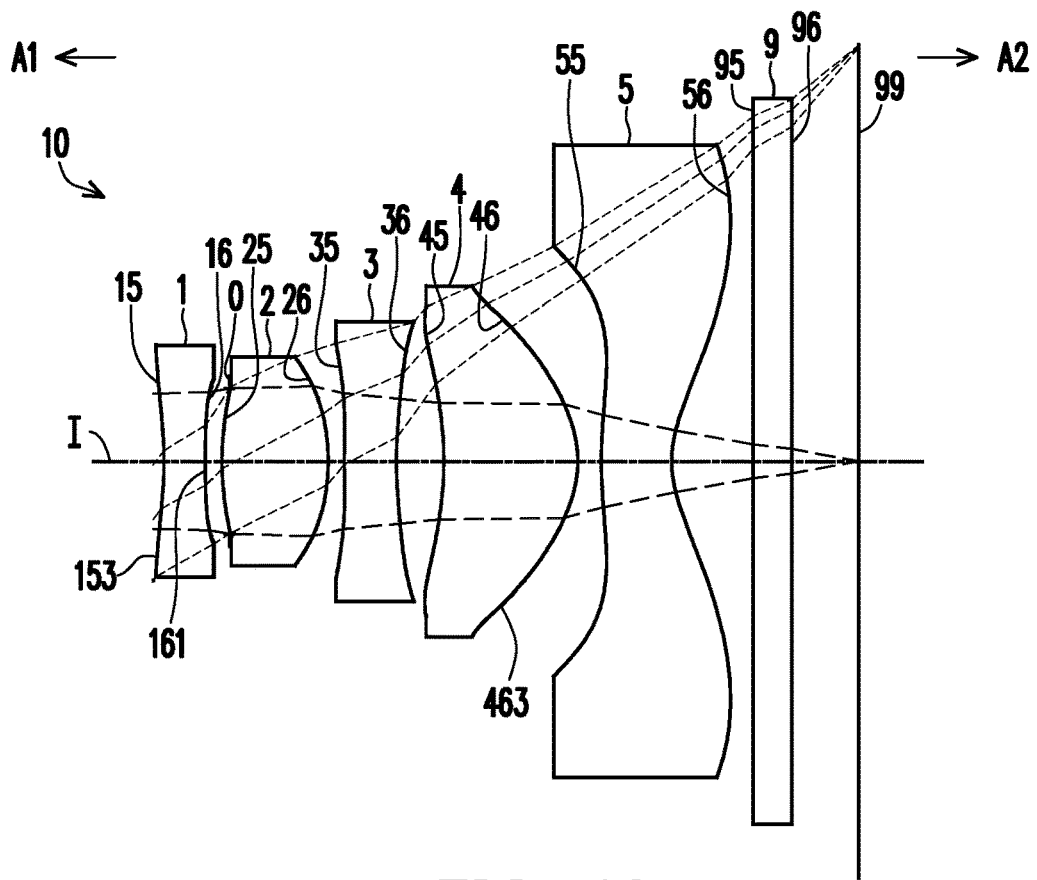
FIG. 10
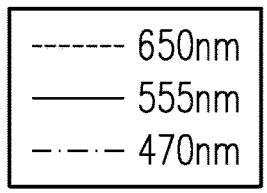
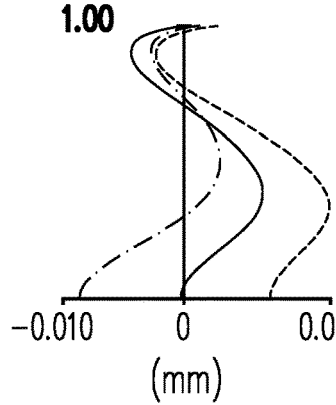
FIG. 11A
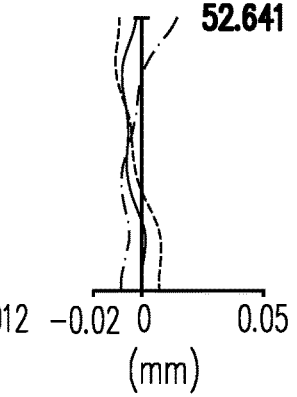
FIG. 11B
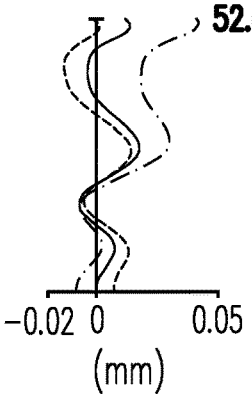
FIG. 11C
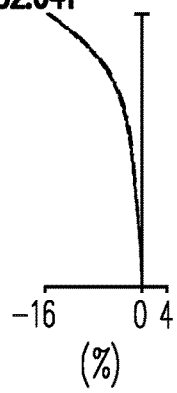
FIG. 11D

| Second embodiment |||||||
|---|---|---|---|---|---|---|
| Effective focus length (EFL) = 2.066 mm, half field of view (HFOV) = 52.641°, total track length (TTL) = 3.834 mm, F-number (Fno) = 2.770, and image height (ImgH) = 2.297 mm. |||||||
| Element | Surface | Curvature radius (mm) | Thickness (mm) | Refractive index | Abbe number | Focal length (mm) |
| Object | | | Infinite | | | |
| First lens element 1 | Object-side surface 15 | -2.008 | 0.230 | 1.535 | 55.690 | -3.546 |
| | Image-side surface 16 | 37.742 | 0.129 | | | |
| Aperture 0 | | Infinite | -0.040 | | | |
| Second lens element 2 | Object-side surface 25 | 1.781 | 0.587 | 1.535 | 55.690 | 1.503 |
| | Image-side surface 26 | -1.304 | 0.090 | | | |
| Third lens element 3 | Object-side surface 35 | 7.314 | 0.289 | 1.661 | 20.373 | -6.068 |
| | Image-side surface 36 | 2.565 | 0.262 | | | |
| Fourth lens element 4 | Object-side surface 45 | -1.773 | 0.738 | 1.535 | 55.690 | 1.405 |
| | Image-side surface 46 | -0.606 | 0.130 | | | |
| Fifth lens element 5 | Object-side surface 55 | 2.694 | 0.389 | 1.567 | 37.490 | -1.454 |
| | Image-side surface 56 | 0.601 | 0.450 | | | |
| Filter 9 | Object-side surface 95 | Infinite | 0.210 | 1.517 | 64.167 | |
| | Image-side surface 96 | Infinite | 0.372 | | | |
| | Image plane 99 | Infinite | | | | |

FIG. 12

| Surface | K | $a_2$ | $a_4$ | $a_6$ | $a_8$ |
|---|---|---|---|---|---|
| 15 | 0.000000E+00 | 0.000000E+00 | 6.502695E-01 | -1.107395E+00 | 4.695039E-01 |
| 16 | 1.094921E+02 | 0.000000E+00 | 1.104795E+00 | -2.390824E+00 | 1.204173E+01 |
| 25 | 0.000000E+00 | 0.000000E+00 | 1.348081E-01 | -5.688133E-02 | -2.383635E+01 |
| 26 | 0.000000E+00 | 0.000000E+00 | -9.957582E-01 | 3.876028E+00 | -1.627327E+01 |
| 35 | 0.000000E+00 | 0.000000E+00 | -1.143689E+00 | 3.046333E+00 | -7.157023E+00 |
| 36 | 0.000000E+00 | 0.000000E+00 | -2.865358E-01 | -1.694147E-01 | 3.411539E+00 |
| 45 | 0.000000E+00 | 0.000000E+00 | 3.043087E-01 | -1.094903E-01 | -5.339334E+00 |
| 46 | -9.549861E-01 | 0.000000E+00 | 9.330151E-01 | -3.162539E+00 | 9.872080E+00 |
| 55 | 0.000000E+00 | 0.000000E+00 | -3.313893E-01 | 2.112450E-01 | -8.206704E-01 |
| 56 | -4.759495E+00 | 0.000000E+00 | -8.967490E-02 | -8.015188E-02 | 1.905264E-01 |
| Surface | $a_{10}$ | $a_{12}$ | $a_{14}$ | $a_{16}$ | $a_{18}$ |
| 15 | 5.140526E+00 | -1.893841E+01 | 3.130857E+01 | -2.110433E+01 | |
| 16 | -3.365711E+01 | -4.121595E+01 | 6.803502E+02 | -1.055619E+03 | |
| 25 | 3.222108E+02 | -2.202578E+03 | 7.926575E+03 | -1.167425E+04 | |
| 26 | 7.272805E+01 | -2.548155E+02 | 5.081606E+02 | -4.114402E+02 | |
| 35 | 3.363423E+01 | -1.297769E+02 | 2.484027E+02 | -1.816471E+02 | |
| 36 | -6.853188E+00 | 2.338166E+00 | 7.670266E+00 | -6.954764E+00 | |
| 45 | 3.116433E+01 | -8.715363E+01 | 1.453283E+02 | -1.458420E+02 | 8.146990E+01 |
| 46 | -2.536626E+01 | 4.583769E+01 | -5.407233E+01 | 3.946389E+01 | -1.617077E+01 |
| 55 | 1.559043E+00 | -1.466206E+00 | 6.614169E-01 | -8.619681E-02 | -2.842918E-02 |
| 56 | -1.823570E-01 | 1.056445E-01 | -3.948611E-02 | 9.314439E-03 | -1.260871E-03 |
| Surface | $a_{20}$ | | | | |
| 15 | | | | | |
| 16 | | | | | |
| 25 | | | | | |
| 26 | | | | | |
| 35 | | | | | |
| 36 | | | | | |
| 45 | -1.962983E+01 | | | | |
| 46 | 2.937548E+00 | | | | |
| 55 | 8.015731E-03 | | | | |
| 56 | 7.461681E-05 | | | | |

FIG. 13

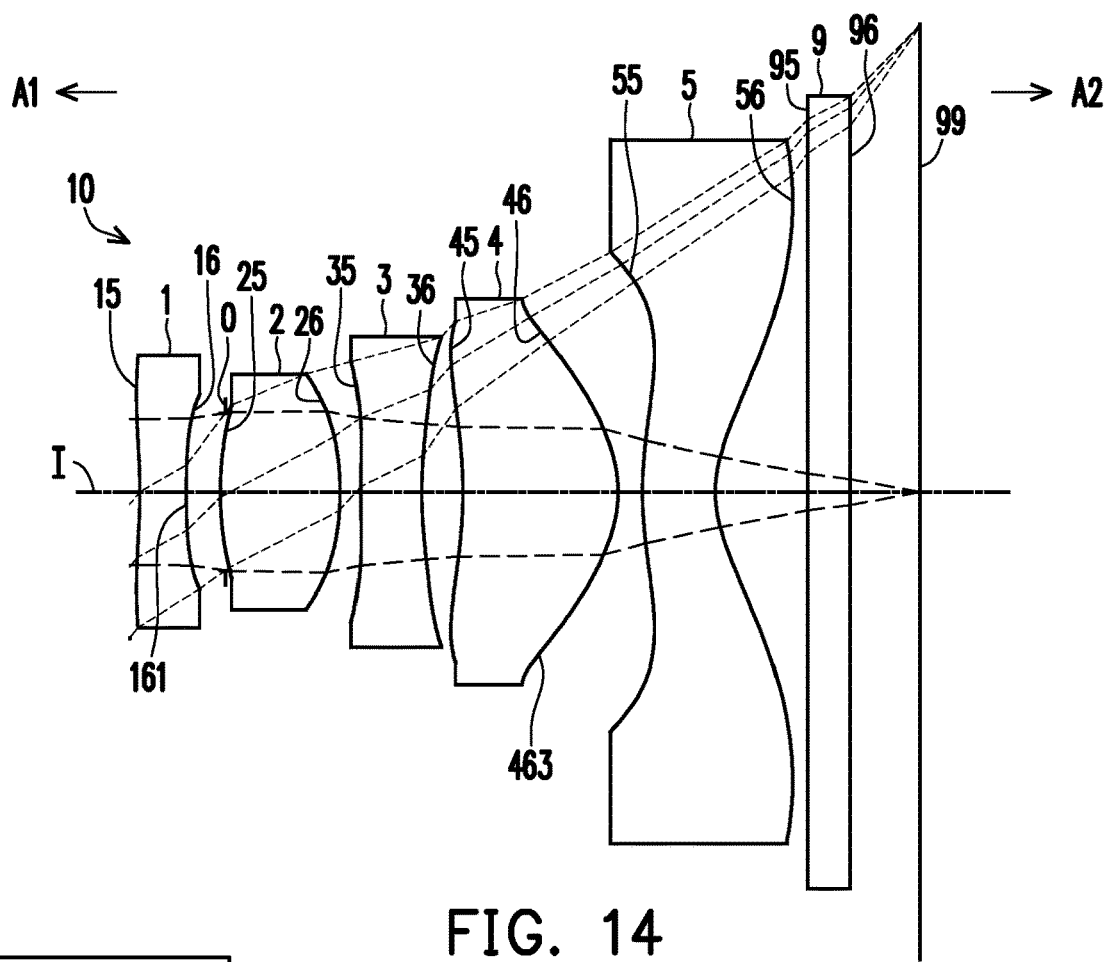
FIG. 14
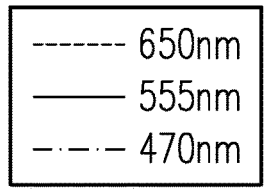
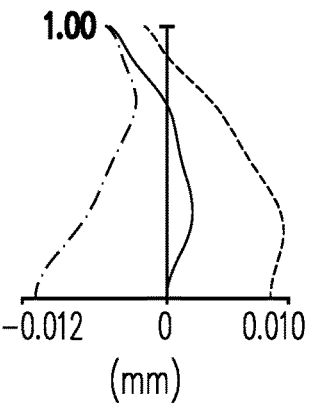
FIG. 15A
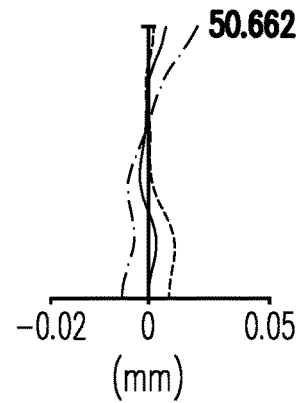
FIG. 15B
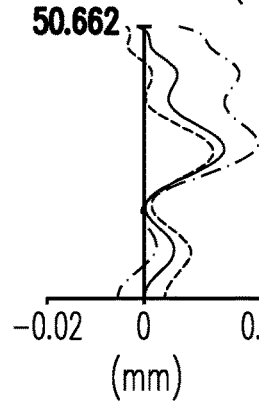
FIG. 15C
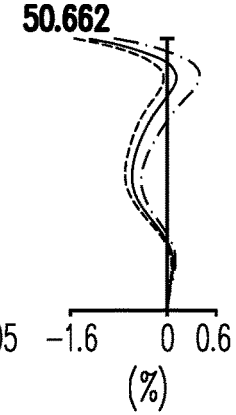
FIG. 15D

| Third embodiment | | | | | | |
|---|---|---|---|---|---|---|
| Effective focus length (EFL) = 1.901 mm, half field of view (HFOV) = 50.662°, total track length (TTL) = 3.8314 mm, F-number (Fno) = 2.666, and image height (ImgH) = 2.297 mm. | | | | | | |
| Element | Surface | Curvature radius (mm) | Thickness (mm) | Refractive index | Abbe number | Focal length (mm) |
| Object | | | Infinite | | | |
| First lens element 1 | Object-side surface 15 | -2.796 | 0.229 | 1.535 | 55.690 | -3.608 |
| | Image-side surface 16 | 6.475 | 0.192 | | | |
| Aperture 0 | | Infinite | -0.024 | | | |
| Second lens element 2 | Object-side surface 25 | 1.739 | 0.588 | 1.535 | 55.690 | 1.621 |
| | Image-side surface 26 | -1.534 | 0.099 | | | |
| Third lens element 3 | Object-side surface 35 | 4.466 | 0.300 | 1.661 | 20.373 | -6.841 |
| | Image-side surface 36 | 2.197 | 0.202 | | | |
| Fourth lens element 4 | Object-side surface 45 | -2.076 | 0.764 | 1.535 | 55.690 | 1.360 |
| | Image-side surface 46 | -0.609 | 0.120 | | | |
| Fifth lens element 5 | Object-side surface 55 | 1.903 | 0.359 | 1.567 | 37.490 | -1.607 |
| | Image-side surface 56 | 0.576 | 0.450 | | | |
| Filter 9 | Object-side surface 95 | Infinite | 0.210 | 1.517 | 64.167 | |
| | Image-side surface 96 | Infinite | 0.342 | | | |
| | Image plane 99 | Infinite | | | | |

FIG. 16

| Surface | K | $a_2$ | $a_4$ | $a_6$ | $a_8$ |
|---|---|---|---|---|---|
| 15 | 0.000000E+00 | 0.000000E+00 | 6.761198E-01 | -1.029335E+00 | 1.904040E-01 |
| 16 | 7.248806E+01 | 0.000000E+00 | 1.091058E+00 | -2.083809E+00 | 1.260643E+01 |
| 25 | 0.000000E+00 | 0.000000E+00 | 1.537967E-01 | -2.608304E-02 | -2.421919E+01 |
| 26 | 0.000000E+00 | 0.000000E+00 | -1.002147E+00 | 3.788042E+00 | -1.626985E+01 |
| 35 | 0.000000E+00 | 0.000000E+00 | -1.218756E+00 | 2.871150E+00 | -7.139028E+00 |
| 36 | 0.000000E+00 | 0.000000E+00 | -3.390187E-01 | -2.310847E-01 | 3.531861E+00 |
| 45 | 0.000000E+00 | 0.000000E+00 | 3.485708E-01 | -5.436049E-02 | -5.293972E+00 |
| 46 | -9.873224E-01 | 0.000000E+00 | 9.504877E-01 | -3.108632E+00 | 9.876988E+00 |
| 55 | 0.000000E+00 | 0.000000E+00 | -3.256552E-01 | 2.034737E+00 | -8.253546E-01 |
| 56 | -4.172940E+00 | 0.000000E+00 | -8.579196E-02 | -8.203500E-02 | 1.907736E-01 |
| Surface | $a_{10}$ | $a_{12}$ | $a_{14}$ | $a_{16}$ | $a_{18}$ |
| 15 | 5.212251E+00 | -1.895193E+01 | 3.174747E+01 | -2.120198E+01 | |
| 16 | -5.262367E+01 | -1.522544E+01 | 9.131011E+02 | -1.952413E+03 | |
| 25 | 3.334608E+02 | -2.232144E+03 | 7.479231E+03 | -9.982887E+03 | |
| 26 | 7.340382E+01 | -2.550296E+02 | 4.932634E+02 | -3.895791E+02 | |
| 35 | 3.468597E+01 | -1.301714E+02 | 2.430743E+02 | -1.756454E+02 | |
| 36 | -6.760257E+00 | 2.271318E+00 | 7.550446E+00 | -7.006095E+00 | |
| 45 | 3.113645E+01 | -8.724370E+01 | 1.452422E+02 | -1.458893E+02 | 8.146943E+01 |
| 46 | -2.536432E+01 | 4.586186E+01 | -5.403864E+01 | 3.948666E+01 | -1.617778E+01 |
| 55 | 1.555987E+00 | -1.467033E+00 | 6.617082E-01 | -8.584667E-02 | -2.830135E-02 |
| 56 | -1.822259E-01 | 1.056666E-01 | -3.948740E-02 | 9.312110E-03 | -1.261467E-03 |
| Surface | $a_{20}$ | | | | |
| 15 | | | | | |
| 16 | | | | | |
| 25 | | | | | |
| 26 | | | | | |
| 35 | | | | | |
| 36 | | | | | |
| 45 | -1.946721E+01 | | | | |
| 46 | 2.890987E+00 | | | | |
| 55 | 8.043168E-03 | | | | |
| 56 | 7.476333E-05 | | | | |

FIG. 17

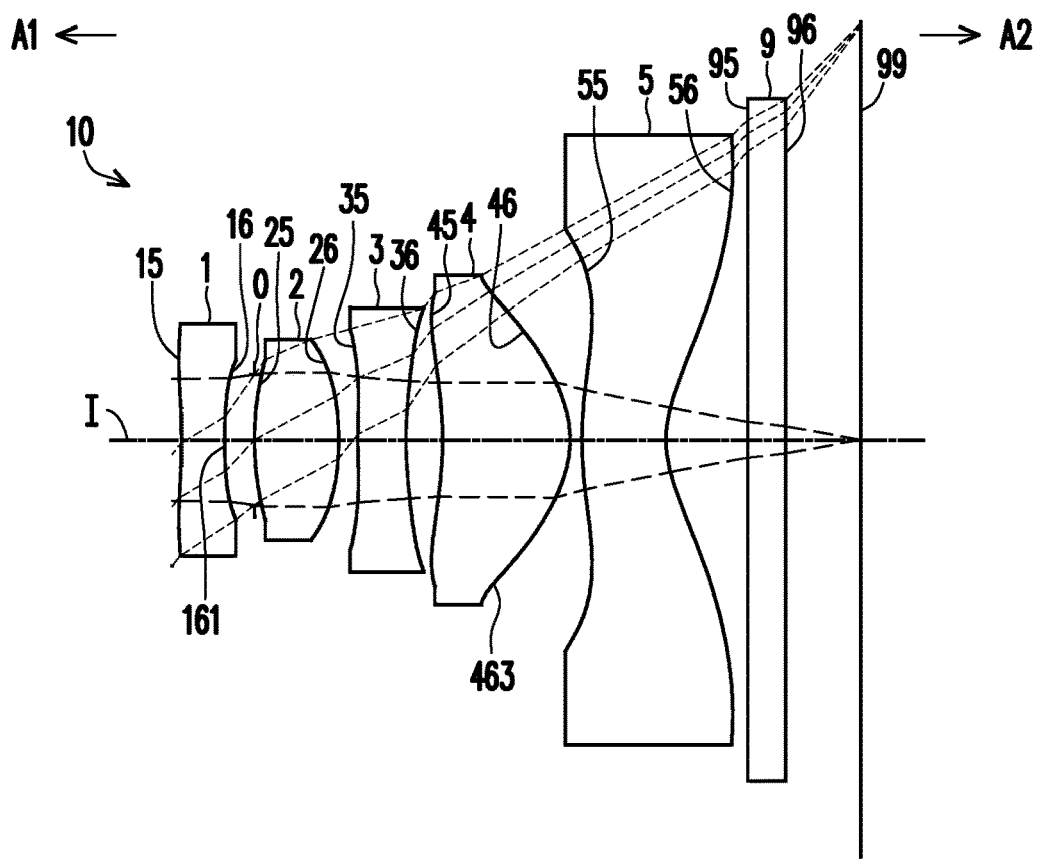
FIG. 18
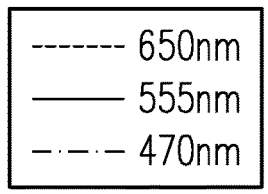
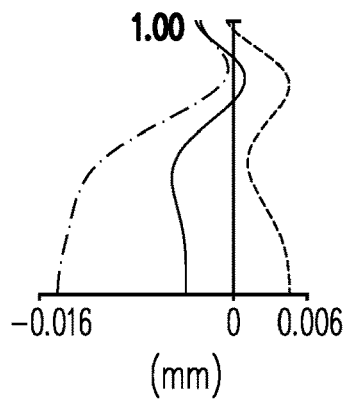
FIG. 19A
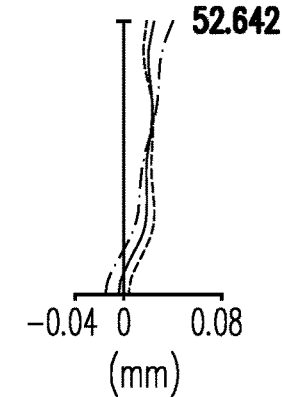
FIG. 19B
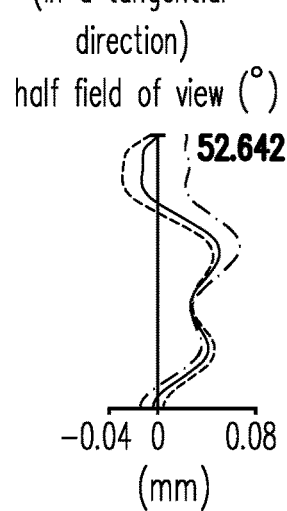
FIG. 19C
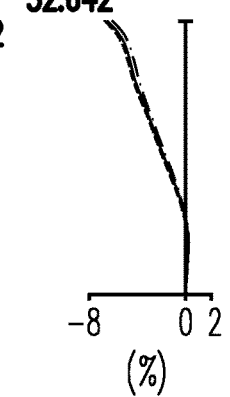
FIG. 19D

| Fourth embodiment | | | | | | |
|---|---|---|---|---|---|---|
| Effective focus length (EFL) = 1.866 mm, half field of view (HFOV) = 52.642°, total track length (TTL) = 3.755 mm, F-number (Fno) = 2.770, and image height (ImgH) = 2.297 mm. | | | | | | |
| Element | Surface | Curvature radius (mm) | Thickness (mm) | Refractive index | Abbe number | Focal length (mm) |
| Object | | | Infinite | | | |
| First lens element 1 | Object-side surface 15 | -3.106 | 0.238 | 1.535 | 55.690 | -3.425 |
| | Image-side surface 16 | 4.621 | 0.164 | | | |
| Aperture 0 | | Infinite | -3.667E-04 | | | |
| Second lens element 2 | Object-side surface 25 | 1.761 | 0.467 | 1.535 | 55.690 | 1.679 |
| | Image-side surface 26 | -1.674 | 0.106 | | | |
| Third lens element 3 | Object-side surface 35 | 4.750 | 0.267 | 1.661 | 20.373 | -6.802 |
| | Image-side surface 36 | 2.268 | 0.203 | | | |
| Fourth lens element 4 | Object-side surface 45 | -1.932 | 0.703 | 1.535 | 55.690 | 1.334 |
| | Image-side surface 46 | -0.589 | 0.066 | | | |
| Fifth lens element 5 | Object-side surface 55 | 2.085 | 0.465 | 1.567 | 37.490 | -1.673 |
| | Image-side surface 56 | 0.601 | 0.450 | | | |
| Filter 9 | Object-side surface 95 | Infinite | 0.210 | 1.517 | 64.167 | |
| | Image-side surface 96 | Infinite | 0.416 | | | |
| | Image plane 99 | Infinite | | | | |

FIG. 20

| Surface | K | $a_2$ | $a_4$ | $a_6$ | $a_8$ |
|---|---|---|---|---|---|
| 15 | 0.000000E+00 | 0.000000E+00 | 6.648818E-01 | -1.004772E+00 | 8.027596E-02 |
| 16 | 5.111526E+01 | 0.000000E+00 | 1.098198E+00 | -1.365597E+00 | 7.925920E+00 |
| 25 | 0.000000E+00 | 0.000000E+00 | 2.208540E-01 | -5.172063E-01 | -2.350098E+01 |
| 26 | 0.000000E+00 | 0.000000E+00 | -1.009638E+00 | 3.567277E+00 | -1.655489E+01 |
| 35 | 0.000000E+00 | 0.000000E+00 | -1.199186E+00 | 2.785334E+00 | -7.059516E+00 |
| 36 | 0.000000E+00 | 0.000000E+00 | -3.096582E-01 | -1.611220E-01 | 3.522204E+00 |
| 45 | 0.000000E+00 | 0.000000E+00 | 3.813769E-01 | -5.515101E-02 | -5.283972E+00 |
| 46 | -9.497698E-01 | 0.000000E+00 | 9.229684E-01 | -3.103250E+00 | 9.882457E+00 |
| 55 | 0.000000E+00 | 0.000000E+00 | -3.004017E-01 | 2.169520E-01 | -8.198923E-01 |
| 56 | -4.702116E+00 | 0.000000E+00 | -7.780173E-02 | -8.179292E-02 | 1.907326E-01 |
| Surface | $a_{10}$ | $a_{12}$ | $a_{14}$ | $a_{16}$ | $a_{18}$ |
| 15 | 5.109628E+00 | -1.863727E+01 | 3.244988E+01 | -2.259374E+01 | |
| 16 | -5.178520E+01 | 3.397914E+01 | 1.024869E+03 | -2.618576E+03 | |
| 25 | 3.427483E+02 | -2.257715E+03 | 7.214102E+03 | -9.117875E+03 | |
| 26 | 7.425057E+01 | -2.543816E+02 | 4.851758E+02 | -4.171909E+02 | |
| 35 | 3.517627E+01 | -1.300935E+02 | 2.403460E+02 | -1.805800E+02 | |
| 36 | -6.839537E+00 | 2.245388E+00 | 7.617037E+00 | -7.204264E+00 | |
| 45 | 3.115081E+01 | -8.724815E+01 | 1.451967E+02 | -1.459644E+02 | 8.143836E+01 |
| 46 | -2.536005E+01 | 4.586868E+01 | -5.402629E+01 | 3.950740E+01 | -1.614490E+01 |
| 55 | 1.557476E+00 | -1.467018E+00 | 6.614149E-01 | -8.603977E-02 | -2.845356E-02 |
| 56 | -1.822480E-01 | 1.056603E-01 | -3.948868E-02 | 9.312063E-03 | -1.261372E-03 |
| Surface | $a_{20}$ | | | | |
| 15 | | | | | |
| 16 | | | | | |
| 25 | | | | | |
| 26 | | | | | |
| 35 | | | | | |
| 36 | | | | | |
| 45 | -1.927563E+01 | | | | |
| 46 | 2.942574E+00 | | | | |
| 55 | 7.926496E-03 | | | | |
| 56 | 7.482630E-05 | | | | |

FIG. 21

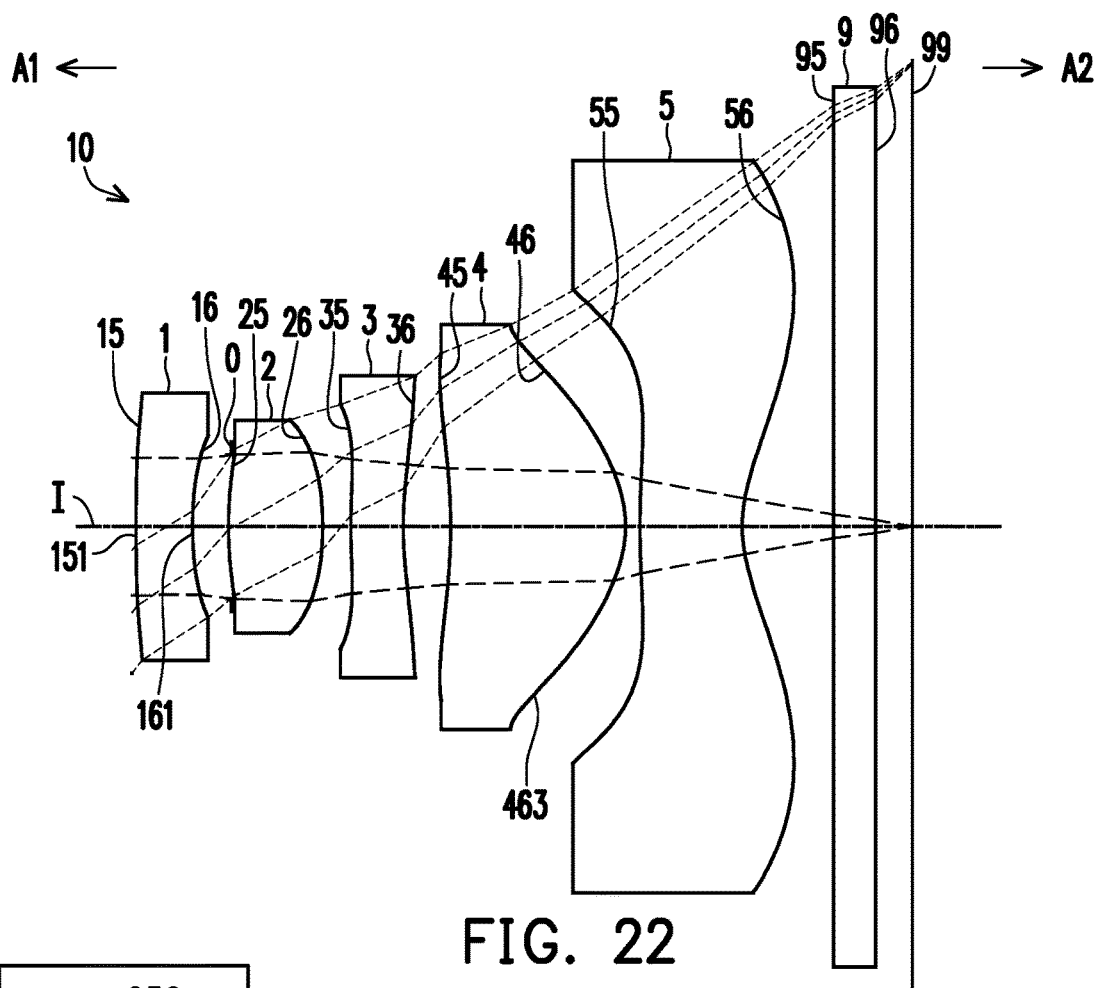
FIG. 22
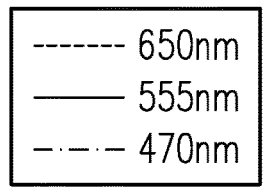
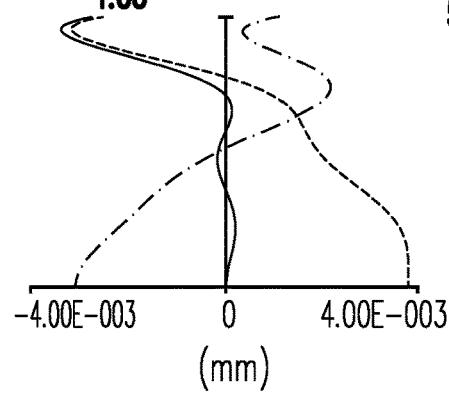
FIG. 23A
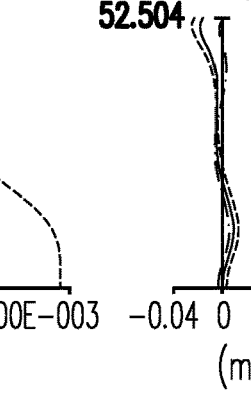
FIG. 23B
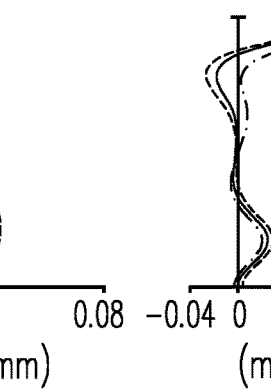
FIG. 23C
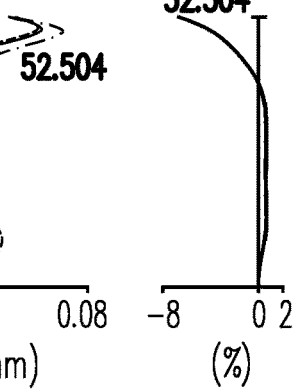
FIG. 23D

| Fifth embodiment | | | | | | |
|---|---|---|---|---|---|---|
| | Effective focus length (EFL) = 1.880 mm, half field of view (HFOV) = 52.504°, total track length (TTL) = 3.844 mm, F-number (Fno) = 2.763, and image height (ImgH) = 2.297 mm. | | | | | |
| Element | Surface | Curvature radius (mm) | Thickness (mm) | Refractive index | Abbe number | Focal length (mm) |
| Object | | | Infinite | | | |
| First lens element 1 | Object-side surface 15 | 34.879 | 0.280 | 1.535 | 55.690 | -3.980 |
| | Image-side surface 16 | 2.007 | 0.192 | | | |
| Aperture 0 | | Infinite | -0.014 | | | |
| Second lens element 2 | Object-side surface 25 | 2.133 | 0.465 | 1.535 | 55.690 | 1.693 |
| | Image-side surface 26 | -1.462 | 0.139 | | | |
| Third lens element 3 | Object-side surface 35 | 3.031 | 0.260 | 1.661 | 20.373 | -8.501 |
| | Image-side surface 36 | 1.907 | 0.236 | | | |
| Fourth lens element 4 | Object-side surface 45 | -2.685 | 0.865 | 1.535 | 55.690 | 1.245 |
| | Image-side surface 46 | -0.595 | 0.072 | | | |
| Fifth lens element 5 | Object-side surface 55 | 4.244 | 0.507 | 1.640 | 23.529 | -1.362 |
| | Image-side surface 56 | 0.693 | 0.450 | | | |
| Filter 9 | Object-side surface 95 | Infinite | 0.210 | 1.517 | 64.167 | |
| | Image-side surface 96 | Infinite | 0.182 | | | |
| | Image plane 99 | Infinite | | | | |

FIG. 24

| Surface | K | $a_2$ | $a_4$ | $a_6$ | $a_8$ |
|---|---|---|---|---|---|
| 15 | 0.000000E+00 | 0.000000E+00 | 3.194555E-01 | -6.211269E-01 | 2.545788E-01 |
| 16 | -1.442327E+00 | 0.000000E+00 | 7.895142E-01 | -1.206351E+00 | 7.657201E+00 |
| 25 | 0.000000E+00 | 0.000000E+00 | 7.614072E-02 | -2.826853E-01 | -1.997460E+01 |
| 26 | 0.000000E+00 | 0.000000E+00 | -8.775032E-01 | 2.806685E+00 | -1.766156E+01 |
| 35 | 0.000000E+00 | 0.000000E+00 | -1.128539E+00 | 1.920278E+00 | -7.702289E+00 |
| 36 | 0.000000E+00 | 0.000000E+00 | -4.569292E-01 | -2.807112E-01 | 3.388703E+00 |
| 45 | 0.000000E+00 | 0.000000E+00 | 2.606596E-01 | -1.157020E-02 | -5.286095E+00 |
| 46 | -9.354525E-01 | 0.000000E+00 | 9.345795E-01 | -3.083804E+00 | 9.866100E+00 |
| 55 | 0.000000E+00 | 0.000000E+00 | -2.595744E-01 | 1.664938E-01 | -8.335830E-01 |
| 56 | -5.775782E+00 | 0.000000E+00 | -8.346397E-02 | -8.831556E-02 | 1.910112E-01 |
| Surface | $a_{10}$ | $a_{12}$ | $a_{14}$ | $a_{16}$ | $a_{18}$ |
| 15 | 3.437518E+00 | -1.612550E+01 | 2.930059E+01 | -1.999133E+01 | |
| 16 | -3.975797E+01 | -1.167454E+01 | 8.629985E+02 | -2.381361E+03 | |
| 25 | 2.853279E+02 | -2.332025E+03 | 9.345666E+03 | -1.578896E+04 | |
| 26 | 6.880271E+01 | -2.464446E+02 | 6.137212E+02 | -8.610659E+02 | |
| 35 | 3.648996E+01 | -1.313271E+02 | 2.500566E+02 | -1.875839E+02 | |
| 36 | -6.949728E+00 | 2.568082E+00 | 7.876128E+00 | -6.939487E+00 | |
| 45 | 3.098137E+01 | -8.749133E+01 | 1.451684E+02 | -1.454973E+02 | 8.228466E+01 |
| 46 | -2.541208E+01 | 4.584096E+01 | -5.400397E+01 | 3.954953E+01 | -1.615526E+01 |
| 55 | 1.555847E+00 | -1.464552E+00 | 6.649619E-01 | -8.332745E-02 | -2.766983E-02 |
| 56 | -1.820957E-01 | 1.056629E-01 | -3.948641E-02 | 9.315488E-03 | -1.260718E-03 |
| Surface | $a_{20}$ | | | | |
| 15 | | | | | |
| 16 | | | | | |
| 25 | | | | | |
| 26 | | | | | |
| 35 | | | | | |
| 36 | | | | | |
| 45 | -2.030136E+01 | | | | |
| 46 | 2.779775E+00 | | | | |
| 55 | 6.736388E-03 | | | | |
| 56 | 7.424070E-05 | | | | |

FIG. 25

| Sixth embodiment ||||||
|---|---|---|---|---|---|
| Effective focus length (EFL) = 1.059 mm, half field of view (HFOV) = 51.995°, total track length (TTL) = 3.064 mm, F-number (Fno) = 2.734, and image height (ImgH) = 2.297 mm. ||||||
| Element | Surface | Curvature radius (mm) | Thickness (mm) | Refractive index | Abbe number | Focal length (mm) |
| Object | | | Infinite | | | |
| First lens element 1 | Object-side surface 15 | 4.216 | 0.202 | 1.535 | 55.690 | -8.899 |
| | Image-side surface 16 | 2.202 | 0.120 | | | |
| Aperture 0 | | Infinite | 0.024 | | | |
| Second lens element 2 | Object-side surface 25 | 2.495 | 0.586 | 1.535 | 55.690 | 1.546 |
| | Image-side surface 26 | -1.141 | 0.165 | | | |
| Third lens element 3 | Object-side surface 35 | 30.409 | 0.200 | 1.661 | 20.373 | -5.017 |
| | Image-side surface 36 | 3.007 | 0.156 | | | |
| Fourth lens element 4 | Object-side surface 45 | -1.768 | 0.689 | 1.567 | 37.490 | 1.372 |
| | Image-side surface 46 | -0.619 | 0.008 | | | |
| Fifth lens element 5 | Object-side surface 55 | 2.972 | 0.312 | 1.531 | 49.620 | 3.555 |
| | Image-side surface 56 | -5.044 | 0.100 | | | |
| Filter 9 | Object-side surface 95 | Infinite | 0.210 | 1.517 | 64.167 | |
| | Image-side surface 96 | Infinite | 0.294 | | | |
| | Image plane 99 | Infinite | | | | |

FIG. 28

| Surface | K | $a_2$ | $a_4$ | $a_6$ | $a_8$ |
|---|---|---|---|---|---|
| 15 | 0.000000E+00 | 0.000000E+00 | 7.624615E-02 | 2.413761E-02 | -4.628792E-01 |
| 16 | 2.256969E+01 | 0.000000E+00 | -2.233451E-01 | -1.127278E+00 | 3.073136E+00 |
| 25 | 0.000000E+00 | 0.000000E+00 | -3.409594E-01 | -6.651678E-01 | -2.344760E+01 |
| 26 | 0.000000E+00 | 0.000000E+00 | -1.072787E+00 | 2.463814E+00 | -1.831953E+01 |
| 35 | 0.000000E+00 | 0.000000E+00 | -1.354948E+00 | 2.571956E+00 | -8.661692E+00 |
| 36 | 0.000000E+00 | 0.000000E+00 | -3.692205E-01 | -1.675743E-01 | 3.512536E+00 |
| 45 | 0.000000E+00 | 0.000000E+00 | 4.243680E-01 | -3.690392E-02 | -5.405836E+00 |
| 46 | -9.215103E-01 | 0.000000E+00 | 9.497155E-01 | -3.202268E+00 | 9.921110E+00 |
| 55 | 0.000000E+00 | 0.000000E+00 | -2.474421E-01 | 1.667340E-01 | -1.081270E+00 |
| 56 | -1.065179E+37 | 0.000000E+00 | -1.213756E-01 | -6.825049E-02 | 1.892890E-01 |
| Surface | $a_{10}$ | $a_{12}$ | $a_{14}$ | $a_{16}$ | $a_{18}$ |
| 15 | 2.038152E+00 | -2.180286E+01 | 4.325094E+01 | 1.461296E+02 | |
| 16 | -6.525254E+01 | 1.571523E+02 | 4.736905E+03 | -1.709651E+04 | |
| 25 | 2.307143E+02 | -7.423385E+03 | -1.344891E+05 | 2.075032E+06 | |
| 26 | 7.231507E+01 | -2.299819E+02 | 5.591750E+02 | -1.107367E+03 | |
| 35 | 3.769713E+01 | -1.243417E+02 | 2.531234E+02 | -2.187273E+02 | |
| 36 | -6.874837E+00 | 2.116427E+00 | 7.541041E+00 | -6.374522E+00 | |
| 45 | 3.096374E+01 | -8.747218E+01 | 1.450793E+02 | -1.455033E+02 | 8.256384E+01 |
| 46 | -2.574328E+01 | 4.635296E+01 | -5.416447E+01 | 3.951293E+01 | -1.618614E+01 |
| 55 | 1.554978E+00 | -1.404284E+00 | 7.108254E-01 | -7.303164E-02 | -5.003592E-02 |
| 56 | -1.817798E-01 | 1.053176E-01 | -3.956361E-02 | 9.317357E-03 | -1.262230E-03 |
| Surface | $a_{20}$ | | | | |
| 15 | | | | | |
| 16 | | | | | |
| 25 | | | | | |
| 26 | | | | | |
| 35 | | | | | |
| 36 | | | | | |
| 45 | -2.046367E+01 | | | | |
| 46 | 2.854117E+00 | | | | |
| 55 | -3.744973E-02 | | | | |
| 56 | 6.882062E-05 | | | | |

FIG. 29

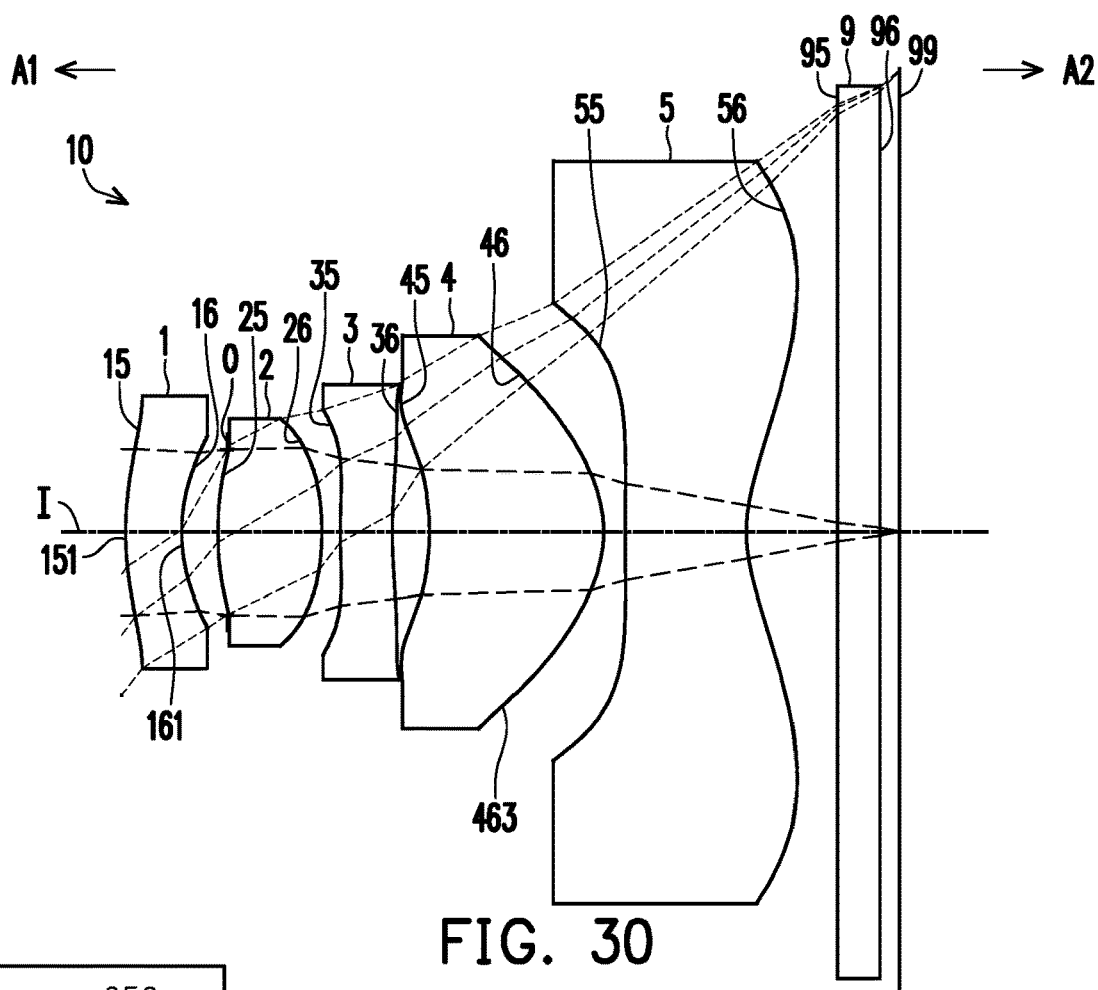
FIG. 30
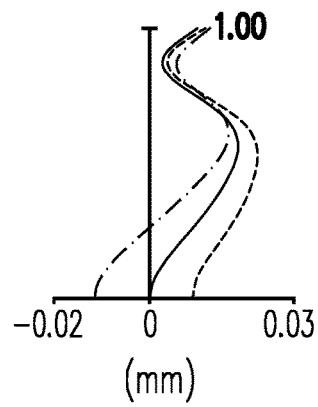
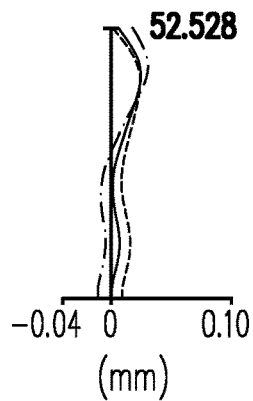
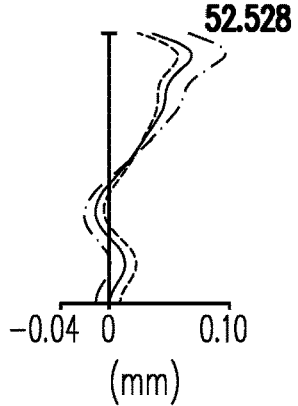
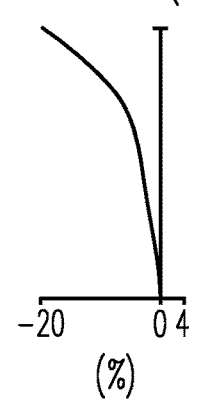
FIG. 31A  FIG. 31B  FIG. 31C  FIG. 31D

| Seventh embodiment ||||||
|---|---|---|---|---|---|
| | Effective focus length (EFL) = 2.175 mm, half field of view (HFOV) = 52.528°, total track length (TTL) = 3.844 mm, F-number (Fno) = 2.621, and image height (ImgH) = 2.297 mm. ||||||
| Element | Surface | Curvature radius (mm) | Thickness (mm) | Refractive index | Abbe number | Focal length (mm) |
| Object | | | Infinite | | | |
| First lens element 1 | Object-side surface 15 | 1.623 | 0.280 | 1.535 | 55.690 | -4.222 |
| | Image-side surface 16 | 0.889 | 0.225 | | | |
| Aperture 0 | | Infinite | -0.045 | | | |
| Second lens element 2 | Object-side surface 25 | 1.547 | 0.514 | 1.535 | 55.690 | 1.467 |
| | Image-side surface 26 | -1.417 | 0.091 | | | |
| Third lens element 3 | Object-side surface 35 | 3.182 | 0.260 | 1.661 | 20.373 | -38.567 |
| | Image-side surface 36 | 2.739 | 0.185 | | | |
| Fourth lens element 4 | Object-side surface45 | -1.157 | 0.865 | 1.535 | 55.690 | 1.525 |
| | Image-side surface 46 | -0.605 | 0.107 | | | |
| Fifth lens element 5 | Object-side surface 55 | 17.637 | 0.603 | 1.640 | 23.529 | -1.258 |
| | Image-side surface 56 | 0.765 | 0.450 | | | |
| Filter 9 | Object-side surface 95 | Infinite | 0.210 | 1.517 | 64.167 | |
| | Image-side surface 96 | Infinite | 0.098 | | | |
| | Image plane 99 | Infinite | | | | |

FIG. 32

| Surface | K | $a_2$ | $a_4$ | $a_6$ | $a_8$ |
|---|---|---|---|---|---|
| 15 | 0.000000E+00 | 0.000000E+00 | -1.837819E-01 | -2.116758E-01 | -8.990454E-01 |
| 16 | -4.683517E+00 | 0.000000E+00 | 8.298541E-01 | -2.400665E+00 | -5.582221E-02 |
| 25 | 0.000000E+00 | 0.000000E+00 | 8.247403E-02 | 5.655777E-01 | -4.628183E+01 |
| 26 | 0.000000E+00 | 0.000000E+00 | -1.159539E+00 | 3.593299E+00 | -1.527226E+01 |
| 35 | 0.000000E+00 | 0.000000E+00 | -1.524123E+00 | 3.073130E+00 | -1.345793E+01 |
| 36 | 0.000000E+00 | 0.000000E+00 | -4.189274E-01 | -4.655850E-01 | 3.528079E+00 |
| 45 | 0.000000E+00 | 0.000000E+00 | 4.371634E-01 | 2.656660E-01 | -5.713689E+00 |
| 46 | -8.940076E-01 | 0.000000E+00 | 8.616239E-01 | -2.897201E+00 | 9.657849E+00 |
| 55 | 0.000000E+00 | 0.000000E+00 | -1.718719E-01 | 1.269190E-01 | -8.173679E-01 |
| 56 | -7.469843E+00 | 0.000000E+00 | -3.297958E-02 | -1.196850E-01 | 2.002398E-01 |
| Surface | $a_{10}$ | $a_{12}$ | $a_{14}$ | $a_{16}$ | $a_{18}$ |
| 15 | 4.464707E+00 | -1.342212E+01 | 2.380262E+01 | -1.705326E+01 | |
| 16 | 1.741315E+01 | 3.185911E+01 | -4.063943E+02 | 8.140361E+02 | |
| 25 | 5.889922E+02 | -3.907998E+03 | 1.292489E+04 | -1.740463E+04 | |
| 26 | 6.510185E+01 | -2.661867E+02 | 5.850637E+02 | -5.896126E+02 | |
| 35 | 5.608620E+01 | -1.550841E+02 | 1.923186E+02 | -3.234919E+01 | |
| 36 | -5.805506E+00 | 1.936509E+00 | 6.236707E+00 | -4.547465E+00 | |
| 45 | 3.111757E+01 | -8.692075E+01 | 1.458724E+02 | -1.458811E+02 | 8.071041E+01 |
| 46 | -2.524460E+01 | 4.580087E+01 | -5.424767E+01 | 3.953529E+01 | -1.585170E+01 |
| 55 | 1.540164E+00 | -1.462358E+00 | 6.692916E-01 | -8.850130E-02 | -3.496267E-02 |
| 56 | -1.816809E-01 | 1.050830E-01 | -3.958885E-02 | 9.334124E-03 | -1.242340E-03 |
| Surface | $a_{20}$ | | | | |
| 15 | | | | | |
| 16 | | | | | |
| 25 | | | | | |
| 26 | | | | | |
| 35 | | | | | |
| 36 | | | | | |
| 45 | -1.980649E+01 | | | | |
| 46 | 2.641191E+00 | | | | |
| 55 | 1.298591E-02 | | | | |
| 56 | 7.097651E-05 | | | | |

FIG. 33

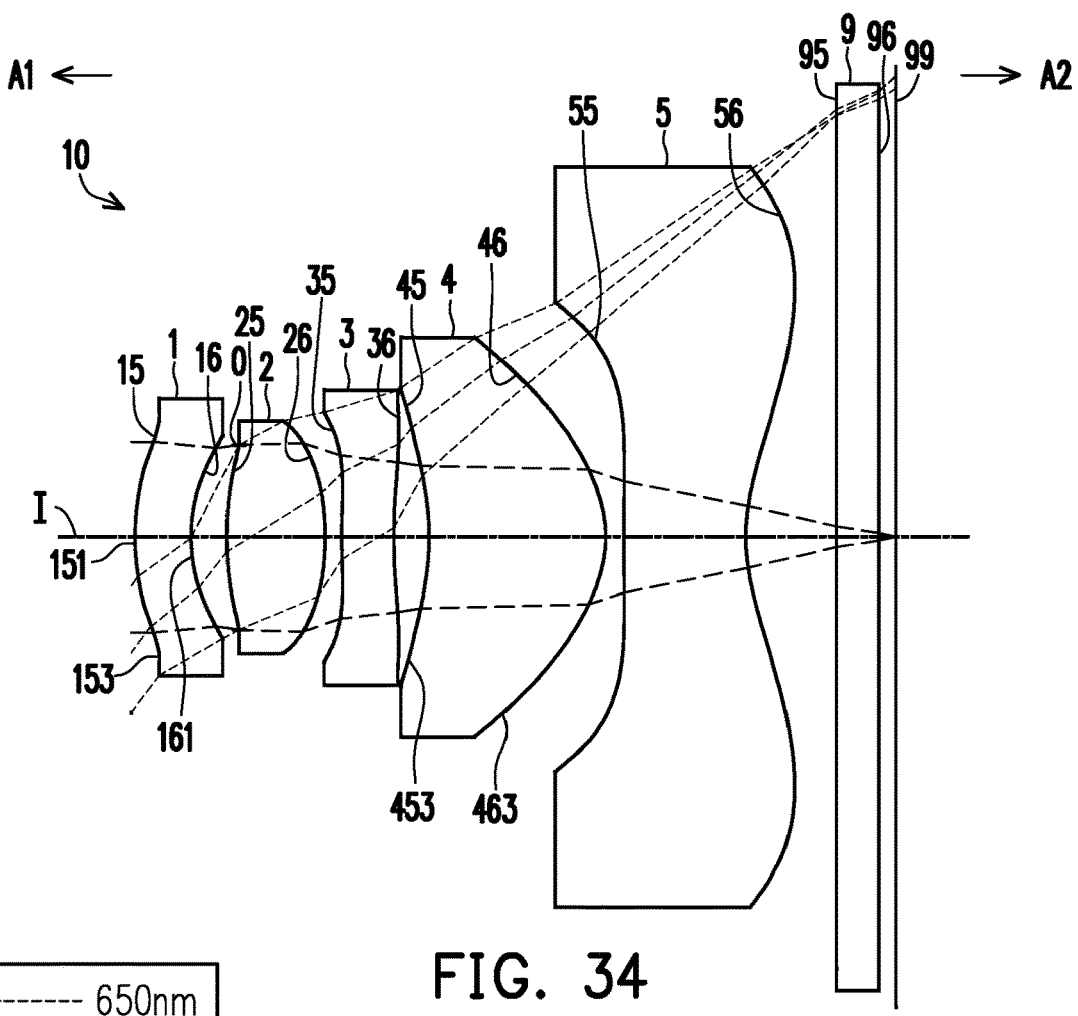
FIG. 34
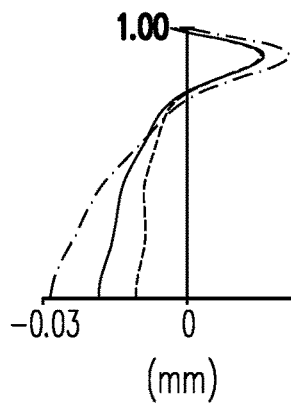
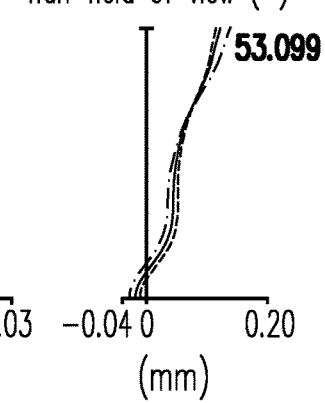
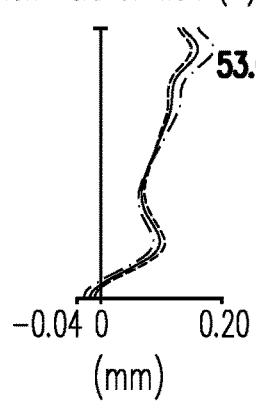
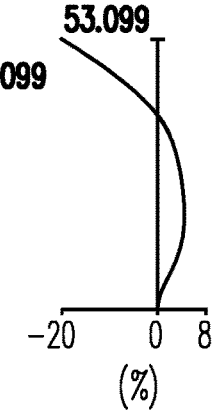
FIG. 35A   FIG. 35B   FIG. 35C   FIG. 35D

| Eighth embodiment ||||||
|---|---|---|---|---|---|
| Effective focus length (EFL) = 2.028 mm, half field of view (HFOV) = 53.099°, total track length (TTL) = 3.792 mm, F-number (Fno) = 2.113, and image height (ImgH) = 2.297 mm. ||||||
| Element | Surface | Curvature radius (mm) | Thickness (mm) | Refractive index | Abbe number | Focal length (mm) |
| Object | | | Infinite | | | |
| First lens element 1 | Object-side surface 15 | 1.283 | 0.280 | 1.535 | 55.690 | -6.631 |
| | Image-side surface 16 | 0.871 | 0.236 | | | |
| Aperture 0 | | Infinite | -0.060 | | | |
| Second lens element 2 | Object-side surface 25 | 1.925 | 0.490 | 1.535 | 55.690 | 1.674 |
| | Image-side surface 26 | -1.535 | 0.084 | | | |
| Third lens element 3 | Object-side surface 35 | 3.078 | 0.260 | 1.661 | 20.373 | -25.708 |
| | Image-side surface 36 | 2.521 | 0.177 | | | |
| Fourth lens element 4 | Object-side surface 45 | -1.259 | 0.879 | 1.535 | 55.690 | 1.508 |
| | Image-side surface 46 | -0.613 | 0.090 | | | |
| Fifth lens element 5 | Object-side surface 55 | 14.776 | 0.610 | 1.640 | 23.529 | -1.661 |
| | Image-side surface56 | 0.982 | 0.450 | | | |
| Filter 9 | Object-side surface 95 | Infinite | 0.210 | 1.517 | 64.167 | |
| | Image-side surface 96 | Infinite | 0.087 | | | |
| | Image plane 99 | Infinite | | | | |

FIG. 36

| Surface | K | $a_2$ | $a_4$ | $a_6$ | $a_8$ |
|---|---|---|---|---|---|
| 15 | 0.000000E+00 | 0.000000E+00 | -1.197644E-01 | -2.273501E-01 | -1.076988E+00 |
| 16 | -3.528551E+00 | 0.000000E+00 | 1.004428E+00 | -2.120340E+00 | 1.151191E+00 |
| 25 | 0.000000E+00 | 0.000000E+00 | 4.390981E-01 | -3.902699E-01 | -4.312892E+01 |
| 26 | 0.000000E+00 | 0.000000E+00 | -1.210021E+00 | 4.205022E+00 | -1.645794E+01 |
| 35 | 0.000000E+00 | 0.000000E+00 | -1.615551E+00 | 3.684240E+00 | -1.573501E+01 |
| 36 | 0.000000E+00 | 0.000000E+00 | -4.256554E-01 | -4.098145E-01 | 3.454304E+00 |
| 45 | 0.000000E+00 | 0.000000E+00 | 4.625815E-01 | 3.098339E-01 | -5.770372E+00 |
| 46 | -8.925693E-01 | 0.000000E+00 | 8.307120E-01 | -2.852631E+00 | 9.622165E+00 |
| 55 | 0.000000E+00 | 0.000000E+00 | -1.466692E-01 | 1.302687E-01 | -8.152964E-01 |
| 56 | -6.758895E+00 | 0.000000E+00 | -3.208409E-02 | -1.199819E-01 | 2.003122E-01 |
| Surface | $a_{10}$ | $a_{12}$ | $a_{14}$ | $a_{16}$ | $a_{18}$ |
| 15 | 3.878141E+00 | -1.441701E+01 | 2.373568E+01 | -1.285763E+01 | |
| 16 | 7.954649E+00 | -2.526035E+01 | -4.541997E+02 | 1.554219E+03 | |
| 25 | 5.985920E+02 | -3.965988E+03 | 1.265399E+04 | -1.602584E+04 | |
| 26 | 6.677295E+01 | -2.634737E+02 | 5.786329E+02 | -5.940531E+02 | |
| 35 | 6.145322E+01 | -1.598353E+02 | 2.011588E+02 | -5.453873E+01 | |
| 36 | -6.495464E+00 | 7.921452E-01 | 4.978617E+00 | 3.110676E+00 | |
| 45 | 3.066251E+01 | -8.817177E+01 | 1.439789E+02 | -1.460680E+02 | 8.567636E+01 |
| 46 | -2.521098E+01 | 4.581018E+01 | -5.428408E+01 | 3.951565E+01 | -1.582309E+01 |
| 55 | 1.542053E+00 | -1.460438E+00 | 6.698410E-01 | -8.890457E-02 | -3.573123E-02 |
| 56 | -1.817301E-01 | 1.050685E-01 | -3.959106E-02 | 9.334342E-03 | -1.242175E-03 |
| Surface | $a_{20}$ | | | | |
| 15 | | | | | |
| 16 | | | | | |
| 25 | | | | | |
| 26 | | | | | |
| 35 | | | | | |
| 36 | | | | | |
| 45 | -1.160052E+01 | | | | |
| 46 | 2.617916E+00 | | | | |
| 55 | 1.207609E-02 | | | | |
| 56 | 7.100653E-05 | | | | |

FIG. 37

| Ninth embodiment | | | | | | |
|---|---|---|---|---|---|---|
| Effective focus length (EFL) = 1.977 mm, half field of view (HFOV) = 52.410°, total track length (TTL) = 4.279 mm, F-number (Fno) = 2.248, and image height (ImgH) = 2.297 mm. | | | | | | |
| Element | Surface | Curvature radius (mm) | Thickness (mm) | Refractive index | Abbe number | Focal length (mm) |
| Object | | | Infinite | | | |
| First lens element 1 | Object-side surface 15 | 3.784 | 0.280 | 1.535 | 55.690 | -4.252 |
| | Image-side surface 16 | 1.387 | 0.236 | | | |
| Aperture 0 | | Infinite | -0.027 | | | |
| Second lens element 2 | Object-side surface 25 | 3.923 | 0.620 | 1.535 | 55.690 | 2.029 |
| | Image-side surface 26 | -1.424 | 0.067 | | | |
| Third lens element 3 | Object-side surface 35 | 2.764 | 0.260 | 1.661 | 20.373 | -7.651 |
| | Image-side surface 36 | 1.726 | 0.153 | | | |
| Fourth lens element 4 | Object-side surface 45 | -11.559 | 1.101 | 1.535 | 55.690 | 1.192 |
| | Image-side surface 46 | -0.626 | 0.059 | | | |
| Fifth lens element 5 | Object-side surface 55 | 5.161 | 0.521 | 1.640 | 23.529 | -1.301 |
| | Image-side surface 56 | 0.693 | 0.612 | | | |
| Filter 9 | Object-side surface 95 | Infinite | 0.210 | 1.517 | 64.167 | |
| | Image-side surface 96 | Infinite | 0.186 | | | |
| | Image plane 99 | Infinite | | | | |

FIG. 40

| Surface | K | $a_2$ | $a_4$ | $a_6$ | $a_8$ |
|---|---|---|---|---|---|
| 15 | 0.000000E+00 | 0.000000E+00 | 5.563636E-01 | -5.135834E-01 | 2.328285E-01 |
| 16 | 3.874025E+00 | 0.000000E+00 | 1.099038E+00 | -1.018700E+00 | 1.301725E+01 |
| 25 | 0.000000E+00 | 0.000000E+00 | 2.466922E-01 | 3.817285E-01 | -2.424225E+01 |
| 26 | 0.000000E+00 | 0.000000E+00 | -9.057713E-01 | 3.616997E+00 | -1.696837E+01 |
| 35 | 0.000000E+00 | 0.000000E+00 | -1.062188E+00 | 2.887525E+00 | -8.218370E+00 |
| 36 | 0.000000E+00 | 0.000000E+00 | -3.817414E-01 | -3.227026E-01 | 3.624762E+00 |
| 45 | 0.000000E+00 | 0.000000E+00 | 2.319407E-01 | -6.999858E-02 | -5.299043E+00 |
| 46 | -9.584956E-01 | 0.000000E+00 | 9.311005E-01 | -3.034734E+00 | 9.833198E+00 |
| 55 | 0.000000E+00 | 0.000000E+00 | -2.520368E-01 | 1.639169E-01 | -8.337938E-01 |
| 56 | -6.085616E+00 | 0.000000E+00 | -9.749579E-02 | -8.279872E-02 | 1.905210E-01 |

| Surface | $a_{10}$ | $a_{12}$ | $a_{14}$ | $a_{16}$ | $a_{18}$ |
|---|---|---|---|---|---|
| 15 | 2.013997E+00 | -7.163900E+00 | 9.679428E+00 | -5.823509E+00 | |
| 16 | -6.123490E+01 | 4.860859E+01 | 1.223423E+03 | -3.173781E+03 | |
| 25 | 3.367750E+02 | -2.238746E+03 | 7.365276E+03 | -9.434521E+03 | |
| 26 | 7.213943E+01 | -2.566988E+02 | 5.041935E+02 | -3.668324E+02 | |
| 35 | 3.455590E+01 | -1.281368E+02 | 2.373753E+02 | -1.610621E+02 | |
| 36 | -7.070524E+00 | 1.742646E+00 | 8.048799E+00 | -6.172259E+00 | |
| 45 | 3.094518E+01 | -8.748408E+01 | 1.452216E+02 | -1.454301E+02 | 8.205499E+01 |
| 46 | -2.544790E+01 | 4.582547E+01 | -5.401589E+01 | 3.952572E+01 | -1.617710E+01 |
| 55 | 1.558622E+00 | -1.463223E+00 | 6.644850E-01 | -8.444840E-02 | -2.844500E-02 |
| 56 | -1.822319E-01 | 1.056500E-01 | -3.949566E-02 | 9.309804E-03 | -1.261538E-03 |

| Surface | $a_{20}$ |
|---|---|
| 15 | |
| 16 | |
| 25 | |
| 26 | |
| 35 | |
| 36 | |
| 45 | -2.029221E+01 |
| 46 | 2.812831E+00 |
| 55 | 7.053599E-03 |
| 56 | 7.512720E-05 |

FIG. 41

| Conditional expression | First embodiment | Second embodiment | Third embodiment | Fourth embodiment | Fifth embodiment |
|---|---|---|---|---|---|
| T1 | 0.246 | 0.230 | 0.229 | 0.238 | 0.280 |
| G12 | 0.226 | 0.089 | 0.168 | 0.164 | 0.178 |
| T2 | 0.645 | 0.587 | 0.588 | 0.467 | 0.465 |
| G23 | 0.101 | 0.090 | 0.099 | 0.106 | 0.139 |
| T3 | 0.277 | 0.289 | 0.300 | 0.267 | 0.260 |
| G34 | 0.153 | 0.262 | 0.202 | 0.203 | 0.236 |
| T4 | 0.838 | 0.738 | 0.764 | 0.703 | 0.865 |
| G45 | 0.140 | 0.130 | 0.120 | 0.066 | 0.072 |
| T5 | 0.369 | 0.389 | 0.359 | 0.465 | 0.507 |
| G5F | 0.450 | 0.450 | 0.450 | 0.450 | 0.450 |
| TF | 0.210 | 0.210 | 0.210 | 0.210 | 0.210 |
| GFP | 0.071 | 0.372 | 0.342 | 0.416 | 0.182 |
| BFL | 0.731 | 1.032 | 1.002 | 1.076 | 0.842 |
| EFL | 1.791 | 2.066 | 1.901 | 1.866 | 1.880 |
| TL | 2.997 | 2.803 | 2.829 | 2.679 | 3.002 |
| TTL | 3.727 | 3.834 | 3.831 | 3.755 | 3.844 |
| ALT | 2.377 | 2.232 | 2.239 | 2.141 | 2.377 |
| AAG | 0.620 | 0.570 | 0.589 | 0.539 | 0.625 |

FIG. 42

| Conditional expression | First embodiment | Second embodiment | Third embodiment | Fourth embodiment | Fifth embodiment |
|---|---|---|---|---|---|
| (T2+T4)/(T1+G12) | 3.140 | 4.160 | 3.402 | 2.908 | 2.900 |
| V2+V3+V4+V5 | 169.242 | 169.242 | 169.242 | 169.242 | 155.282 |
| (T4+T5)/T1 | 4.900 | 4.900 | 4.900 | 4.904 | 4.900 |
| BFL/(T3+G34) | 1.700 | 1.873 | 1.995 | 2.289 | 1.700 |
| ALT/(T1+G23+T3) | 3.803 | 3.668 | 3.565 | 3.501 | 3.500 |
| EFL/(T2+G45) | 2.281 | 2.881 | 2.687 | 3.500 | 3.500 |
| (BFL+AAG)/(T4+G45) | 1.381 | 1.846 | 1.802 | 2.099 | 1.567 |
| TL/BFL | 4.100 | 2.717 | 2.822 | 2.491 | 3.564 |
| ALT/AAG | 3.835 | 3.915 | 3.800 | 3.973 | 3.801 |
| TTL/(T1+G12+T2) | 3.334 | 4.235 | 3.889 | 4.320 | 4.163 |
| (T3+AAG)/T5 | 2.429 | 2.209 | 2.480 | 1.732 | 1.745 |
| (T3+T4)/T1 | 4.527 | 4.465 | 4.645 | 4.073 | 4.016 |
| ALT/(G34+T5) | 4.554 | 3.431 | 3.992 | 3.205 | 3.200 |
| EFL/(G12+T4) | 1.683 | 2.501 | 2.040 | 2.152 | 1.802 |
| HFOV/Fno | 19.006 | 19.004 | 19.003 | 19.004 | 19.003 |
| AAG/(G12+G23) | 1.894 | 3.200 | 2.205 | 1.996 | 1.969 |
| T2/(T3+G45) | 1.547 | 1.400 | 1.400 | 1.400 | 1.400 |
| (G23+ALT)/T4 | 2.956 | 3.148 | 3.062 | 3.196 | 2.910 |
| (T3+T4)/AAG | 1.800 | 1.800 | 1.805 | 1.801 | 1.799 |

FIG. 43

| Conditional expression | Sixth embodiment | Seventh embodiment | Eighth embodiment | Ninth embodiment |
|---|---|---|---|---|
| T1 | 0.202 | 0.280 | 0.280 | 0.280 |
| G12 | 0.144 | 0.180 | 0.176 | 0.208 |
| T2 | 0.586 | 0.514 | 0.490 | 0.620 |
| G23 | 0.165 | 0.091 | 0.084 | 0.067 |
| T3 | 0.200 | 0.260 | 0.260 | 0.260 |
| G34 | 0.156 | 0.185 | 0.177 | 0.153 |
| T4 | 0.689 | 0.865 | 0.879 | 1.101 |
| G45 | 0.008 | 0.107 | 0.090 | 0.059 |
| T5 | 0.312 | 0.603 | 0.610 | 0.521 |
| G5F | 0.100 | 0.450 | 0.450 | 0.612 |
| TF | 0.210 | 0.210 | 0.210 | 0.210 |
| GFP | 0.294 | 0.098 | 0.087 | 0.186 |
| BFL | 0.604 | 0.758 | 0.747 | 1.008 |
| EFL | 1.059 | 2.175 | 2.028 | 1.977 |
| TL | 2.460 | 3.086 | 3.045 | 3.271 |
| TTL | 3.064 | 3.844 | 3.792 | 4.279 |
| ALT | 1.988 | 2.523 | 2.519 | 2.782 |
| AAG | 0.472 | 0.563 | 0.526 | 0.488 |

FIG. 44

| Conditional expression | Sixth embodiment | Seventh embodiment | Eighth embodiment | Ninth embodiment |
|---|---|---|---|---|
| (T2+T4)/(T1+G12) | 3.692 | 3.000 | 3.000 | 3.524 |
| V2+V3+V4+V5 | 163.172 | 155.282 | 155.282 | 155.282 |
| (T4+T5)/T1 | 4.963 | 5.245 | 5.318 | 5.795 |
| BFL/(T3+G34) | 1.700 | 1.704 | 1.710 | 2.438 |
| ALT/(T1+G23+T3) | 3.513 | 3.995 | 4.039 | 4.582 |
| EFL/(T2+G45) | 1.783 | 3.499 | 3.500 | 2.912 |
| (BFL+AAG)/(T4+G45) | 1.544 | 1.359 | 1.314 | 1.289 |
| TL/BFL | 4.072 | 4.072 | 4.077 | 3.245 |
| ALT/AAG | 4.213 | 4.478 | 4.787 | 5.700 |
| TTL/(T1+G12+T2) | 3.289 | 3.947 | 4.009 | 3.861 |
| (T3+AAG)/T5 | 2.156 | 1.364 | 1.288 | 1.435 |
| (T3+T4)/T1 | 4.408 | 4.018 | 4.066 | 4.862 |
| ALT/(G34+T5) | 4.256 | 3.200 | 3.200 | 4.124 |
| EFL/(G12+T4) | 1.272 | 2.082 | 1.923 | 1.509 |
| HFOV/Fno | 19.018 | 20.041 | 25.130 | 23.314 |
| AAG/(G12+G23) | 1.530 | 2.077 | 2.026 | 1.770 |
| T2/(T3+G45) | 2.824 | 1.400 | 1.399 | 1.943 |
| (G23+ALT)/T4 | 3.125 | 3.022 | 2.962 | 2.588 |
| (T3+T4)/AAG | 1.883 | 1.997 | 2.164 | 2.789 |

FIG. 45

OPTICAL IMAGING LENS

CROSS-REFERENCE TO RELATED APPLICATION

This application claims the priority benefit of China application serial no. 201911043756.3, filed on Oct. 30, 2019. The entirety of the above-mentioned patent application is hereby incorporated by reference herein and made a part of this specification.

BACKGROUND OF THE INVENTION

1. Field of the Invention

The disclosure relates to an optical element, and in particular, to an optical imaging lens.

2. Description of Related Art

In recent years, an optical imaging lens has been continuously improved. The optical imaging lens is required to be light, thin, and small, and it is also important to expand a field of view of the optical imaging lens and improve imaging quality such as reducing an astigmatic aberration and a chromatic aberration of the lens.

However, if a distance from an object-side surface of a first lens element of the optical imaging lens to an image plane along an optical axis is increased as required, mobile phones and digital cameras cannot stay thin. Therefore, it is always a goal to design a light, thin, and small optical imaging lens with a large field of view and desired imaging quality. Furthermore, the optical imaging lens tends to be designed to occupy a smaller area when being arranged in a photographing apparatus.

SUMMARY OF THE INVENTION

The disclosure provides an optical imaging lens, which has a relatively large field of view and a shorter length, occupies a smaller area when being arranged in a photographing apparatus, and maintains desired imaging quality.

An embodiment of the disclosure provides an optical imaging lens, sequentially including a first lens element, an aperture, a second lens element, a third lens element, a fourth lens element, and a fifth lens element from an object side to an image side along an optical axis. Each of the first lens element to the fifth lens element includes an object-side surface facing the object side and allowing imaging rays to pass through and an image-side surface facing the image side and allowing the imaging rays to pass through. The first lens element has negative refracting power. A periphery region of the object-side surface of the third lens element is concave, and a periphery region of the image-side surface of the third lens element is concave. Only the first lens element to the fifth lens element of the optical imaging lens have refracting power, and the optical imaging lens satisfies the following conditional expression: $(T2+T4)/(T1+G12) \geq 2.900$. T1 is a thickness of the first lens element along the optical axis, T2 is a thickness of the second lens element along the optical axis, T4 is a thickness of the fourth lens element along the optical axis, and G12 is an air gap between the first lens element and the second lens element along the optical axis.

An embodiment of the disclosure provides an optical imaging lens, sequentially including a first lens element, an aperture, a second lens element, a third lens element, a fourth lens element, and a fifth lens element from an object side to an image side along an optical axis. Each of the first lens element to the fifth lens element includes an object-side surface facing the object side and allowing imaging rays to pass through and an image-side surface facing the image side and allowing the imaging rays to pass through. A periphery region of the image-side surface of the third lens element is concave. The fourth lens element has positive refracting power. Only the first lens element to the fifth lens element of the optical imaging lens have refracting power, and the optical imaging lens satisfies the following conditional expressions: $(T2+T4)/(T1+G12) \geq 2.900$ and $V2+V3+V4+V5 \leq 170.000$. T1 is a thickness of the first lens element along the optical axis, T2 is a thickness of the second lens element along the optical axis, T4 is a thickness of the fourth lens element along the optical axis, G12 is an air gap between the first lens element and the second lens element along the optical axis, V2 is an Abbe number of the second lens element, V3 is an Abbe number of the third lens element, V4 is an Abbe number of the fourth lens element, and V5 is an Abbe number of the fifth lens element.

An embodiment of the disclosure provides an optical imaging lens, sequentially including a first lens element, an aperture, a second lens element, a third lens element, a fourth lens element, and a fifth lens element from an object side to an image side along an optical axis. Each of the first lens element to the fifth lens element includes an object-side surface facing the object side and allowing imaging rays to pass through and an image-side surface facing the image side and allowing the imaging rays to pass through. A periphery region of the object-side surface of the third lens element is concave, and a periphery region of the image-side surface of the third lens element is concave. Only the first lens element to the fifth lens element of the optical imaging lens have refracting power, and the optical imaging lens satisfies the following conditional expressions: $(T2+T4)/(T1+G12) \geq 2.900$ and $V2+V3+V4+V5 \leq 170.000$. T1 is a thickness of the first lens element along the optical axis, T2 is a thickness of the second lens element along the optical axis, T4 is a thickness of the fourth lens element along the optical axis, G12 is an air gap between the first lens element and the second lens element along the optical axis, V2 is an Abbe number of the second lens element, V3 is an Abbe number of the third lens element, V4 is an Abbe number of the fourth lens element, and V5 is an Abbe number of the fifth lens element.

Based on the above, the optical imaging lens in the embodiments of the disclosure has the following beneficial effects: as designed to satisfy the foregoing concave-convex surface arrangement of lens elements and refracting power conditions and satisfy the foregoing conditional expressions, the optical imaging lens can have a relatively large field of view, occupy a smaller area when being arranged in a photographing apparatus, have a shorter length, and maintain desired imaging quality.

In order to make the aforementioned features and advantages of the disclosure comprehensible, embodiments accompanied with accompanying drawings are described in detail below.

BRIEF DESCRIPTION OF THE DRAWINGS

FIG. 8 shows detailed optical data of the optical imaging lens according to the first embodiment of the disclosure.

FIG. 9 shows an aspheric surface parameter of the optical imaging lens according to the first embodiment of the disclosure.

FIG. 10 is a schematic diagram of an optical imaging lens according to a second embodiment of the disclosure.

FIG. 11A to FIG. 11D are diagrams of longitudinal spherical aberrations and astigmatic aberrations of the optical imaging lens according to the second embodiment.

FIG. 12 shows detailed optical data of the optical imaging lens according to the second embodiment of the disclosure.

FIG. 13 shows an aspheric surface parameter of the optical imaging lens according to the second embodiment of the disclosure.

FIG. 14 is a schematic diagram of an optical imaging lens according to a third embodiment of the disclosure.

FIG. 15A to FIG. 15D are diagrams of longitudinal spherical aberrations and astigmatic aberrations of the optical imaging lens according to the third embodiment.

FIG. 16 shows detailed optical data of the optical imaging lens according to the third embodiment of the disclosure.

FIG. 17 shows an aspheric surface parameter of the optical imaging lens according to the third embodiment of the disclosure.

FIG. 18 is a schematic diagram of an optical imaging lens according to a fourth embodiment of the disclosure.

FIG. 19A to FIG. 19D are diagrams of longitudinal spherical aberrations and astigmatic aberrations of the optical imaging lens according to the fourth embodiment.

FIG. 20 shows detailed optical data of the optical imaging lens according to the fourth embodiment of the disclosure.

FIG. 21 shows an aspheric surface parameter of the optical imaging lens according to the fourth embodiment of the disclosure.

FIG. 22 is a schematic diagram of an optical imaging lens according to a fifth embodiment of the disclosure.

FIG. 23A to FIG. 23D are diagrams of longitudinal spherical aberrations and astigmatic aberrations of the optical imaging lens according to the fifth embodiment.

FIG. 24 shows detailed optical data of the optical imaging lens according to the fifth embodiment of the disclosure.

FIG. 25 shows an aspheric surface parameter of the optical imaging lens according to the fifth embodiment of the disclosure.

FIG. 28 shows detailed optical data of the optical imaging lens according to the sixth embodiment of the disclosure.

FIG. 29 shows an aspheric surface parameter of the optical imaging lens according to the sixth embodiment of the disclosure.

FIG. 30 is a schematic diagram of an optical imaging lens according to a seventh embodiment of the disclosure.

FIG. 31A to FIG. 31D are diagrams of longitudinal spherical aberrations and astigmatic aberrations of the optical imaging lens according to the seventh embodiment.

FIG. 32 shows detailed optical data of the optical imaging lens according to the seventh embodiment of the disclosure.

FIG. 33 shows an aspheric surface parameter of the optical imaging lens according to the seventh embodiment of the disclosure.

FIG. 34 is a schematic diagram of an optical imaging lens according to an eighth embodiment of the disclosure.

FIG. 35A to FIG. 35D are diagrams of longitudinal spherical aberrations and astigmatic aberrations of the optical imaging lens according to the eighth embodiment.

FIG. 36 shows detailed optical data of the optical imaging lens according to the eighth embodiment of the disclosure.

FIG. 37 shows an aspheric surface parameter of the optical imaging lens according to the eighth embodiment of the disclosure.

FIG. 40 shows detailed optical data of the optical imaging lens according to the ninth embodiment of the disclosure.

FIG. 41 shows an aspheric surface parameter of the optical imaging lens according to the ninth embodiment of the disclosure.

FIG. 42 and FIG. 43 show numerical values of important parameters and relational expressions of the optical imaging lens of the first to fifth embodiments of the disclosure.

FIG. 44 and FIG. 45 show numerical values of important parameters and relational expressions of the optical imaging lens of the sixth to ninth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
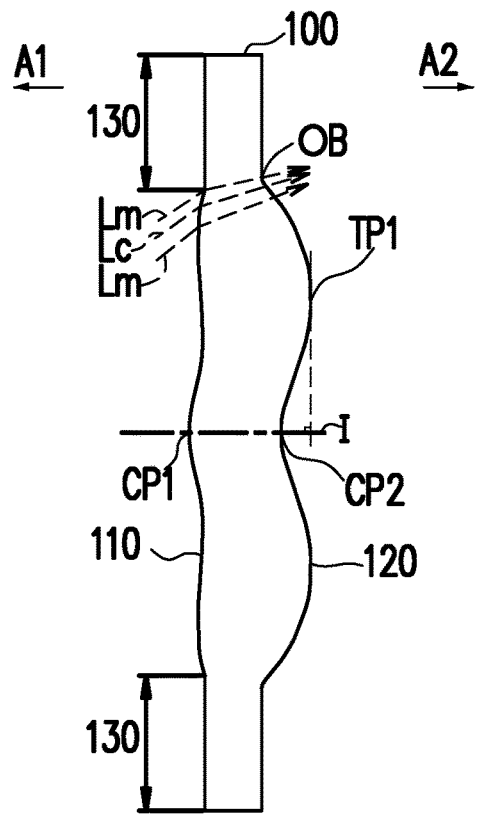
FIG. 1 is a schematic diagram to describe a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
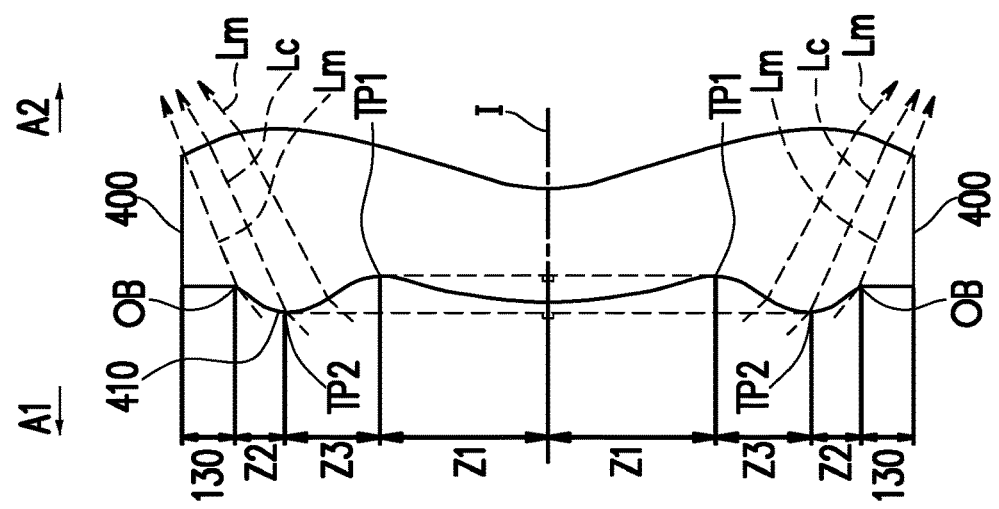
FIG. 4 is a schematic diagram to describe a surface structure of a lens element in an example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
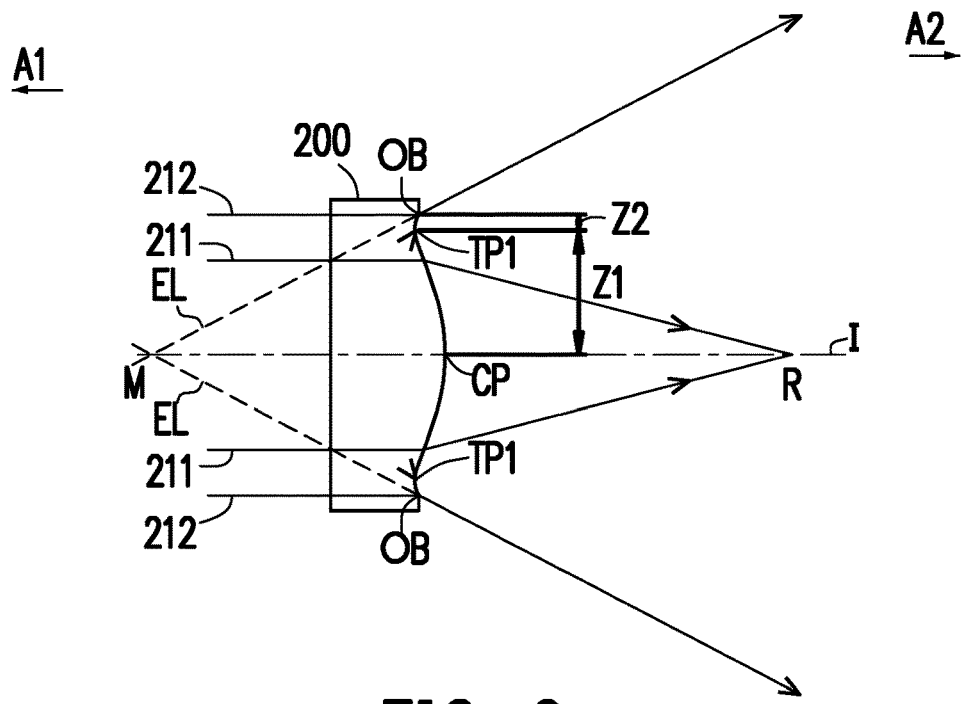
FIG. 2 is a schematic diagram to describe a concave-convex surface structure and a ray focus of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
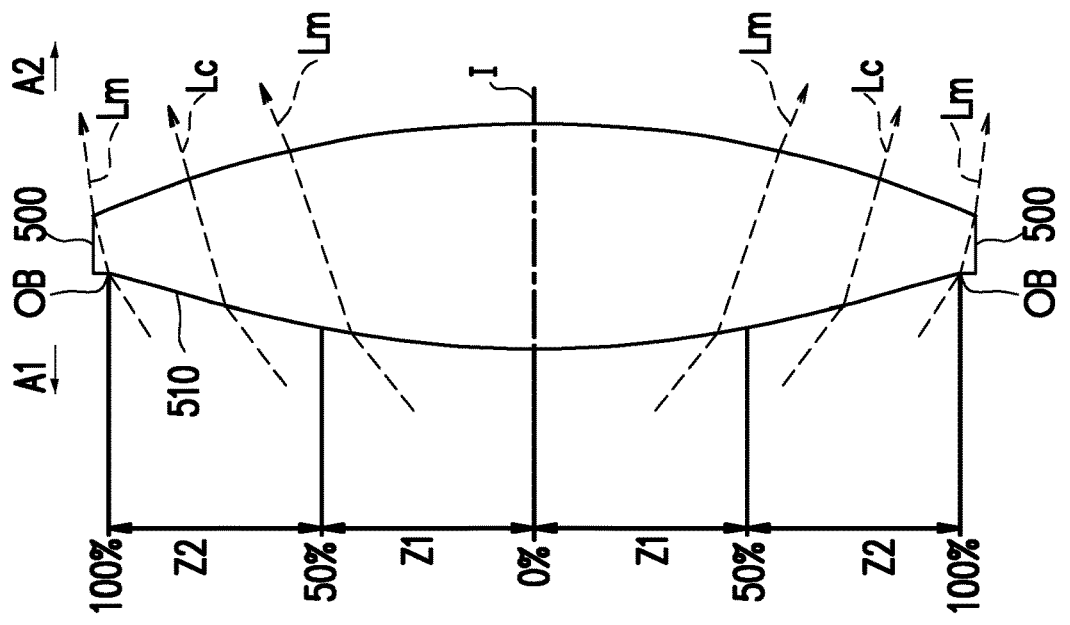
FIG. 5 is a schematic diagram to describe a surface structure of a lens element in an example 3.
Figure 3:
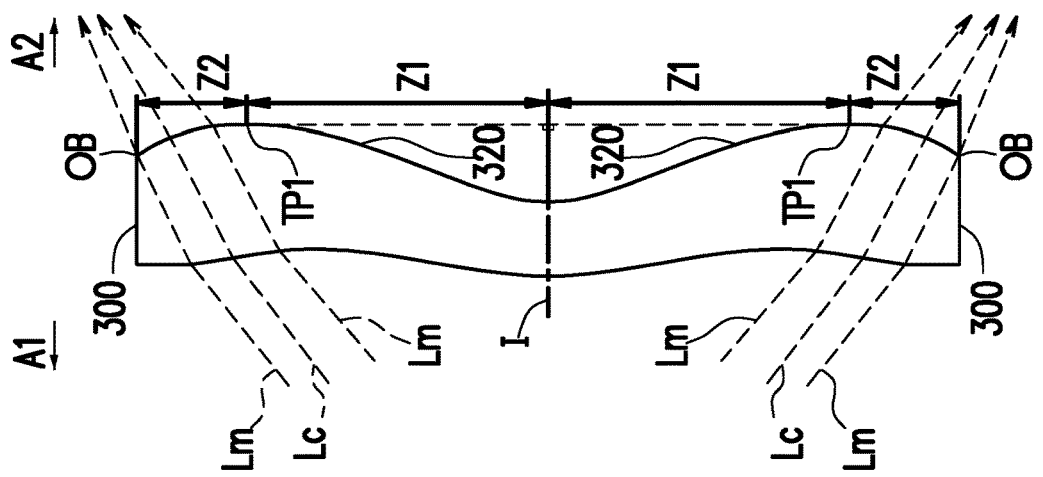
FIG. 3 is a schematic diagram to describe a surface structure of a lens element in an example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
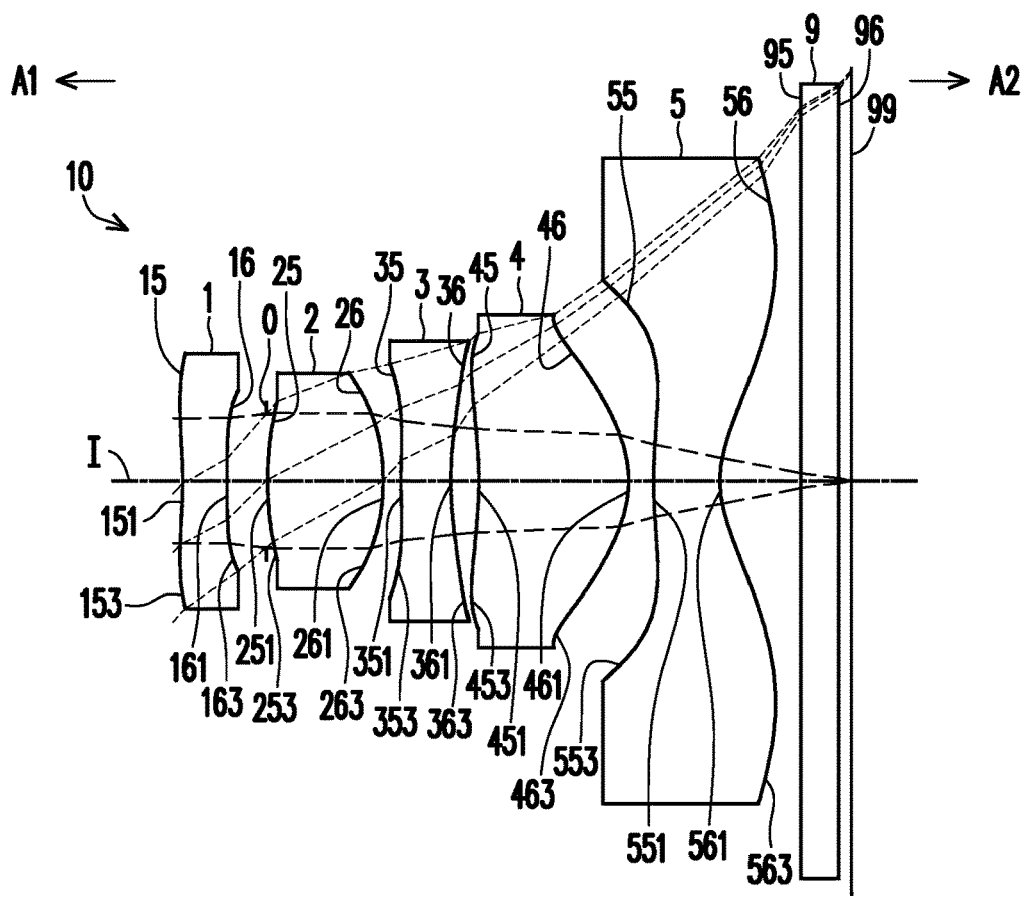
FIG. 6 is a schematic diagram of an optical imaging lens according to a first embodiment of the disclosure.

FIG. 6 is a schematic diagram of an optical imaging lens according to a first embodiment of the disclosure. FIG. 7A to FIG. 7D are diagrams of longitudinal spherical aberrations and astigmatic aberrations of the optical imaging lens according to the first embodiment. Referring to FIG. 6 first, an optical imaging lens 10 in the first embodiment of the disclosure sequentially includes a first lens element 1, an aperture 0, a second lens element 2, a third lens element 3, a fourth lens element 4, a fifth lens element 5, and a filter 9 from an object side A1 to an image side A2 along an optical axis I of the optical imaging lens 10. After entering the optical imaging lens 10, rays emitted by a to-be-photographed object pass through the first lens element 1, the aperture 0, the second lens element 2, the third lens element 3, the fourth lens element 4, the fifth lens element 5, and the filter 9, and form an image on an image plane 99. The filter 9 is disposed between an image-side surface 56 of the fifth lens element 5 and the image plane 99. It should be noted that, the object side is a side facing the to-be-photographed object, and the image side is a side facing the image plane 99. In the present embodiment, the filter 9 is an infrared ray (IR) cut filter.

In the present embodiment, the first lens element 1, the second lens element 2, the third lens element 3, the fourth lens element 4, the fifth lens element 5, and the filter 9 of the optical imaging lens 10 include object-side surfaces 15, 25, 35, 45, 55, and 95 facing the object side and allowing imaging rays to pass through and image-side surfaces 16, 26, 36, 46, 56, and 96 facing the image side and allowing imaging rays to pass through, respectively. In the present embodiment, the aperture 0 is disposed between the first lens element 1 and the second lens element 2.

The first lens element 1 has negative refracting power. The first lens element 1 is made from a plastic material. An optical axis region 151 of the object-side surface 15 of the first lens element 1 is concave, and a periphery region 153 of the object-side surface 15 of the first lens element 1 is convex. An optical axis region 161 of the image-side surface 16 of the first lens element 1 is convex, and a periphery region 163 of the image-side surface 16 of the first lens element 1 is concave. In the present embodiment, both the object-side surface 15 and the image-side surface 16 of the first lens element 1 are aspheric surfaces, but the disclosure is not limited thereto.

The second lens element 2 has positive refracting power. The second lens element 2 is made from a plastic material. An optical axis region 251 of the object-side surface 25 of the second lens element 2 is convex, and a periphery region 253 of the object-side surface 25 of the second lens element 2 is convex. An optical axis region 261 of the image-side surface 26 of the second lens element 2 is convex, and a periphery region 263 of the image-side surface 26 of the second lens element 2 is convex. In the present embodiment, both the object-side surface 25 and the image-side surface 26 of the second lens element 2 are aspheric surfaces, but the disclosure is not limited thereto.

The third lens element 3 has negative refracting power. The third lens element 3 is made from a plastic material. An optical axis region 351 of the object-side surface 35 of the third lens element 3 is convex, and a periphery region 353 of the object-side surface 35 of the third lens element 3 is concave. An optical axis region 361 of the image-side surface 36 of the third lens element 3 is concave, and a periphery region 363 of the image-side surface 36 of the third lens element 3 is concave. In the present embodiment, both the object-side surface 35 and the image-side surface 36 of the third lens element 3 are aspheric surfaces, but the disclosure is not limited thereto.

The fourth lens element 4 has positive refracting power. The fourth lens element 4 is made from a plastic material. An optical axis region 451 of the object-side surface 45 of the fourth lens element 4 is concave, and a periphery region 453 of the object-side surface 45 of the fourth lens element 4 is convex. An optical axis region 461 of the image-side surface 46 of the fourth lens element 4 is convex, and a periphery region 463 of the image-side surface 46 of the fourth lens element 4 is concave. In the present embodiment, both the object-side surface 45 and the image-side surface 46 of the fourth lens element 4 are aspheric surfaces, but the disclosure is not limited thereto.

The fifth lens element 5 has negative refracting power. The fifth lens element 5 is made from a plastic material. An optical axis region 551 of the object-side surface 55 of the fifth lens element 5 is convex, and a periphery region 553 of the object-side surface 55 of the fifth lens element 5 is concave. An optical axis region 561 of the image-side surface 56 of the fifth lens element 5 is concave, and a periphery region 563 of the image-side surface 56 of the fifth lens element 5 is convex. In the present embodiment, both the object-side surface 55 and the image-side surface 56 of the fifth lens element 5 are aspheric surfaces, but the disclosure is not limited thereto.

In the present embodiment, only the five lens elements of the optical imaging lens 10 have refracting power.

Other detailed optical data of the first embodiment is shown in FIG. 8, and the optical imaging lens 10 in the first embodiment has an effective focal length (EFL) of 1.791 millimeters (mm), an HFOV of 48.675°, a F-number (Fno) of 2.561, a total track length (TTL) of 3.727 mm, and an image height of 2.297 mm. The TTL is a distance from the object-side surface 15 of the first lens element 1 to the image plane 99 along the optical axis I.

In addition, in the present embodiment, all the object-side surfaces 15, 25, 35, 45, and 55 and the image-side surfaces 16, 26, 36, 46, and 56 of the first lens element 1, the second lens element 2, the third lens element 3, the fourth lens element 4, and the fifth lens element 5 are aspheric surfaces, and are general even aspheric surfaces. The aspheric surfaces are defined by the following formula:

$$Z(Y) = \frac{Y^2}{R} \bigg/ \left( 1 + \sqrt{1 - (1+K)\frac{Y^2}{R^2}} \right) + \sum_{i=1}^{n} a_{2i} \times Y^{2i} \qquad (1)$$

where:

R is a curvature radius at a position, near the optical axis I, of a surface of a lens element;

Z is a depth of an aspheric surface (a perpendicular distance between a point on the aspheric surface and having a distance Y to the optical axis I and a plane, tangent to the aspheric surface, of a vertex on the optical axis I);

Y is distance between a point on an aspheric surface curve and the optical axis I;

K is a conic constant; and $a_{2i}$ is a $(2i)^{th}$-order aspheric surface coefficient.

Aspheric surface coefficients of the object-side surface 15 of the first lens element 1 to the image-side surface 56 of the fifth lens element 5 in Formula (1) are shown in FIG. 9. In FIG. 9, a field number 15 corresponds to aspheric surface coefficients of the object-side surface 15 of the first lens element 1, and other fields may be deduced by analogy.

In addition, a relationship between important parameters of the optical imaging lens 10 in the first embodiment is shown in FIG. 42 and FIG. 43.

In FIG. 42 and FIG. 43,

EFL is an effective focal length of the optical imaging lens 10;

HFOV is a half field of view of the optical imaging lens 10;

Fno is a F-number of the optical imaging lens 10;

ImgH is an image height of the optical imaging lens 10;

T1 is a thickness of the first lens element 1 along the optical axis I;

T2 is a thickness of the second lens element 2 along the optical axis I;

T3 is a thickness of the third lens element 3 along the optical axis I;

T4 is a thickness of the fourth lens element 4 along the optical axis I;

T5 is a thickness of the fifth lens element 5 along the optical axis I;

G12 is a distance from the image-side surface 16 of the first lens element 1 to the object-side surface 25 of the second lens element 2 along the optical axis I, namely, an air gap between the first lens element 1 and the second lens element 2 along the optical axis I;

G23 is a distance from the image-side surface 26 of the second lens element 2 to the object-side surface 35 of the third lens element 3 along the optical axis I, namely, an air gap between the second lens element 2 and the third lens element 3 along the optical axis I;

G34 is a distance from the image-side surface 36 of the third lens element 3 to the object-side surface 45 of the fourth lens element 4 along the optical axis I, namely, an air gap between the third lens element 3 and the fourth lens element 4 along the optical axis I;

G45 is a distance from the image-side surface 46 of the fourth lens element 4 to the object-side surface 55 of the fifth lens element 5 along the optical axis I, namely, an air gap between the fourth lens element 4 and the fifth lens element 5 along the optical axis I;

G5F is a distance from the image-side surface 56 of the fifth lens element 5 to the object-side surface 95 of the filter 9 along the optical axis I, namely, an air gap between the fifth lens element 5 and the filter 9 along the optical axis I;

TF is a thickness of the filter 9 along the optical axis I;

GFP is a distance from the image-side surface 96 of the filter 9 to the image plane 99 along the optical axis I, namely, an air gap between the filter 9 and the image plane 99 along the optical axis I;

TTL is a distance from the object-side surface 15 of the first lens element 1 to the image plane 99 along the optical axis I;

BFL is a distance from the image-side surface 56 of the fifth lens element 5 to the image plane 99 along the optical axis I;

AAG is a sum of four air gaps G12, G23, G34, and G45 between the first lens element 1 and the fifth lens element 5 along the optical axis I;

ALT is a sum of five thicknesses T1, T2, T3, T4, and T5 of the first lens element 1 to the fifth lens element 5 along the optical axis I; and TL is a distance from the object-side surface 15 of the first lens element 1 to the image-side surface 56 of the fifth lens element 5 along the optical axis I.

In addition, the following parameters are defined:

f1 is a focal length of the first lens element 1;

f2 is a focal length of the second lens element 2;

f3 is a focal length of the third lens element 3;

f4 is a focal length of the fourth lens element 4;

f5 is a focal length of the fifth lens element 5;

n1 is a refractive index of the first lens element 1;

n2 is a refractive index of the second lens element 2;

n3 is a refractive index of the third lens element 3;

n4 is a refractive index of the fourth lens element 4;

n5 is a refractive index of the fifth lens element 5;

V1 is an Abbe number of the first lens element 1, which may also be referred to as a dispersion coefficient;

V2 is an Abbe number of the second lens element 2;

V3 is an Abbe number of the third lens element 3;

V4 is an Abbe number of the fourth lens element 4; and

V5 is an Abbe number of the fifth lens element 5.

Figures 7A, 7B, 7C, 7D:
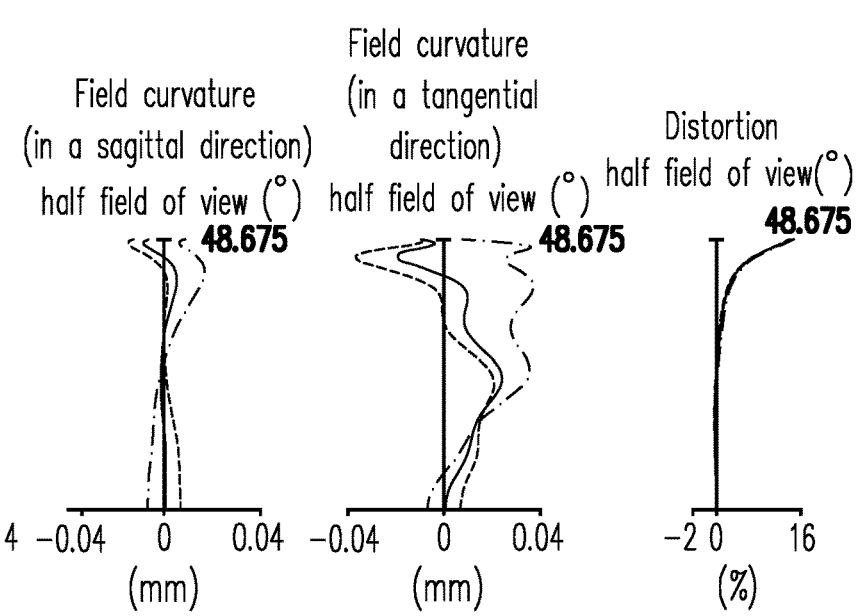
FIG. 7A to FIG. 7D are diagrams of longitudinal spherical aberrations and astigmatic aberrations of the optical imaging lens according to the first embodiment.

Further referring to FIG. 7A to FIG. 7D, FIG. 7A graphically illustrates longitudinal spherical aberrations according to the first embodiment, FIG. 7B and FIG. 7C respectively graphically illustrate field curvature aberrations in a sagittal direction and field curvature aberrations in a tangential direction on the image plane 99 in cases of wavelengths 470 nm, 555 nm, and 650 nm according to the first embodiment, and FIG. 7D graphically illustrates distortion aberrations on the image plane 99 in cases of wavelengths 470 nm, 555 nm, and 650 nm according to the first embodiment. The longitudinal spherical aberrations of the first embodiment are shown in FIG. 7A, and curves of all the wavelengths are quite close to each other and approach the middle. It indicates that off-axis rays of all the wavelengths at different heights are focused near an imaging point. From deflection amplitude of the curves of all the wavelengths, it can be seen that imaging point deviations of the off-axis rays at different heights are controlled within a range of ±0.014 mm. Therefore, a spherical aberration of a same wavelength is definitely reduced in the first embodiment. In addition, the three representative wavelengths are also quite close to each other. It indicates that imaging positions of rays of different wavelengths are quite focused. Therefore, chromatic and astigmatic aberrations are also definitely reduced.

In the two field curvature aberration diagrams of FIG. 7B and FIG. 7C, focal length variations of the three representative wavelengths in an entire field of view fall within a range of ±0.04 mm. It indicates that astigmatic aberrations can be effectively eliminated by the optical system in the first embodiment. The distortion aberration diagram of FIG. 7D shows that the distortion aberrations of the first embodiment are retained within a range of ±14%. It indicates that the distortion aberrations of the first embodiment satisfy an imaging quality requirement of the optical system. To be specific, different from an existing optical lens, the first embodiment can still provide desired imaging quality when the TTL is reduced to approximately 3.727 mm. Therefore, the first embodiment can have a shorter length and achieve desired imaging quality while maintaining desired optical properties.

FIG. 10 is a schematic diagram of an optical imaging lens according to a second embodiment of the disclosure. FIG. 11A to FIG. 11D are diagrams of longitudinal spherical aberrations and astigmatic aberrations of the optical imaging lens according to the second embodiment. Referring to FIG. 10 first, the second embodiment of the optical imaging lens 10 of the disclosure is basically similar to the first embodiment, which differs as follows: optical data, aspheric surface coefficients, and parameters between the lens elements 1, 2, 3, 4, and 5 are different to some extent. In addition, in the present embodiment, the periphery region 153 of the object-side surface 15 of the first lens element 1 is concave. The optical axis region 161 of the image-side surface 16 of the first lens element 1 is concave. The periphery region 463 of the image-side surface 46 of the fourth lens element 4 is convex. Herein, it should be noted that, for clearly presenting the diagram, same reference numbers of optical axis regions and periphery regions in the two embodiments are omitted in FIG. 10.

Detailed optical data of the optical imaging lens 10 in the second embodiment is shown in FIG. 12, and the optical imaging lens 10 in the second embodiment has an EFL of 2.066 mm, an HFOV of 52.641°, a Fno of 2.770, a TTL of 3.834 mm, and an image height of 2.297 mm.

Aspheric surface coefficients of the object-side surface 15 of the first lens element 1 to the image-side surface 56 of the fifth lens element 5 in the second embodiment in Formula (1) are shown in FIG. 13.

In addition, a relationship between important parameters of the optical imaging lens 10 in the second embodiment is shown in FIG. 42 and FIG. 43.

Longitudinal spherical aberrations of the second embodiment are shown in FIG. 11A, and imaging point deviations of off-axis rays at different heights are controlled within a range of ±0.012 mm. In two field curvature aberration diagrams of FIG. 11B and FIG. 11C, focal length variations of three representative wavelengths in an entire field of view fall within a range of ±0.05 mm. A distortion aberration diagram of FIG. 11D shows that distortion aberrations of the second embodiment are retained within a range of ±16%.

Based on the above, it can be seen that the HFOV in the second embodiment is greater than the HFOV in the first embodiment. Therefore, compared with the first embodiment, the second embodiment has a larger image receiving angle. In addition, the longitudinal spherical aberrations of the second embodiment are less than the longitudinal spherical aberrations of the first embodiment.

FIG. 14 is a schematic diagram of an optical imaging lens according to a third embodiment of the disclosure. FIG. 15A to FIG. 15D are diagrams of longitudinal spherical aberrations and astigmatic aberrations of the optical imaging lens according to the third embodiment. Referring to FIG. 14 first, the third embodiment of the optical imaging lens 10 of the disclosure is basically similar to the first embodiment, which differ as follows: optical data, aspheric surface coefficients, and parameters between the lens elements 1, 2, 3, 4, and 5 are different to some extent. In addition, in the present embodiment, the optical axis region 161 of the image-side surface 16 of the first lens element 1 is concave. The periphery region 463 of the image-side surface 46 of the fourth lens element 4 is convex. Herein, it should be noted that, for clearly presenting the diagram, same reference numbers of optical axis regions and periphery regions in the two embodiments are omitted in FIG. 14.

Detailed optical data of the optical imaging lens 10 in the third embodiment is shown in FIG. 16, and the optical imaging lens 10 in the third embodiment has an EFL of 1.901 mm, an HFOV of 50.662°, a Fno of 2.666, a TTL of 3.8314 mm, and an image height of 2.297 mm.

Aspheric surface coefficients of the object-side surface 15 of the first lens element 1 to the image-side surface 56 of the fifth lens element 5 in the third embodiment in Formula (1) are shown in FIG. 17.

In addition, a relationship between important parameters of the optical imaging lens 10 in the third embodiment is shown in FIG. 42 and FIG. 43.

Longitudinal spherical aberrations of the third embodiment are shown in FIG. 15A, and imaging point deviations of off-axis rays at different heights are controlled within a range of ±0.012 mm. In two field curvature aberration diagrams of FIG. 15B and FIG. 15C, focal length variations of three representative wavelengths in an entire field of view fall within a range of ±0.05 mm. A distortion aberration diagram of FIG. 15D shows that distortion aberrations of the third embodiment are retained within a range of ±1.6%.

Based on the above, it can be seen that the HFOV in the third embodiment is greater than the HFOV in the first embodiment. Therefore, compared with the first embodiment, the third embodiment has a larger image receiving angle. In addition, the longitudinal spherical aberrations of the third embodiment are less than the longitudinal spherical aberrations of the first embodiment, and the distortion aberrations of the third embodiment are less than the distortion aberrations of the first embodiment.

FIG. 18 is a schematic diagram of an optical imaging lens according to a fourth embodiment of the disclosure. FIG. 19A to FIG. 19D are diagrams of longitudinal spherical aberrations and astigmatic aberrations of the optical imaging lens according to the fourth embodiment. Referring to FIG. 18 first, the fourth embodiment of the optical imaging lens 10 of the disclosure is basically similar to the first embodiment, which differ as follows: optical data, aspheric surface coefficients, and parameters between the lens elements 1, 2, 3, 4, and 5 are different to some extent. In addition, in the present embodiment, the optical axis region 161 of the image-side surface 16 of the first lens element 1 is concave. The periphery region 463 of the image-side surface 46 of the fourth lens element 4 is convex. Herein, it should be noted that, for clearly presenting the diagram, same reference numbers of optical axis regions and periphery regions in the two embodiments are omitted in FIG. 18.

Detailed optical data of the optical imaging lens 10 in the fourth embodiment is shown in FIG. 20, and the optical imaging lens 10 in the fourth embodiment has an EFL of 1.866 mm, an HFOV of 52.642°, a Fno of 2.770, a TTL of 3.755 mm, and an image height of 2.297 mm.

Aspheric surface coefficients of the object-side surface 15 of the first lens element 1 to the image-side surface 56 of the fifth lens element 5 in the fourth embodiment in Formula (1) are shown in FIG. 21.

In addition, a relationship between important parameters of the optical imaging lens 10 in the fourth embodiment is shown in FIG. 42 and FIG. 43.

Longitudinal spherical aberrations of the fourth embodiment are shown in FIG. 19A, and imaging point deviations of off-axis rays at different heights are controlled within a range of ±0.016 mm. In two field curvature aberration diagrams of FIG. 19B and FIG. 19C, focal length variations of three representative wavelengths in an entire field of view fall within a range of ±0.08 mm. A distortion aberration diagram of FIG. 19D shows that distortion aberrations of the fourth embodiment are retained within a range of ±7%.

Based on the above, it can be seen that the HFOV in the fourth embodiment is greater than the HFOV in the first embodiment. Therefore, compared with the first embodiment, the fourth embodiment has a larger image receiving angle. In addition, the distortion aberrations of the fourth embodiment are less than distortion aberrations of the first embodiment.

FIG. 22 is a schematic diagram of an optical imaging lens according to a fifth embodiment of the disclosure. FIG. 23A to FIG. 23D are diagrams of longitudinal spherical aberrations and astigmatic aberrations of the optical imaging lens according to the fifth embodiment. Referring to FIG. 22 first, the fifth embodiment of the optical imaging lens 10 of the disclosure is basically similar to the first embodiment, which differ as follows: the fifth lens element 5 has a different Abbe number (the Abbe number V5 of the fifth lens element 5 in the fifth embodiment is 23.529, while the Abbe number V5 of the fifth lens element 5 in the first embodiment is 37.490), and optical data, aspheric surface coefficients, and parameters between the lens elements 1, 2, 3, 4, and 5 are different to some extent. In addition, in the present embodiment, the optical axis region 151 of the object-side surface 15 of the first lens element 1 is convex. The optical axis region 161 of the image-side surface 16 of the first lens element 1 is concave. The periphery region 463 of the image-side surface 46 of the fourth lens element 4 is convex. Herein, it should be noted that, for clearly presenting the diagram, same reference numbers of optical axis regions and periphery regions in the two embodiments are omitted in FIG. 22.

Detailed optical data of the optical imaging lens 10 in the fifth embodiment is shown in FIG. 24, and the optical imaging lens 10 in the fifth embodiment has an EFL of 1.880 mm, an HFOV of 52.504°, a Fno of 2.763, a TTL of 3.844 mm, and an image height of 2.297 mm.

Aspheric surface coefficients of the object-side surface 15 of the first lens element 1 to the image-side surface 56 of the fifth lens element 5 in the fifth embodiment in Formula (1) are shown in FIG. 25.

In addition, a relationship between important parameters of the optical imaging lens 10 in the fifth embodiment is shown in FIG. 42 and FIG. 43.

Longitudinal spherical aberrations of the fifth embodiment are shown in FIG. 23A, and imaging point deviations of off-axis rays at different heights are controlled within a range of ±0.004 mm. In two field curvature aberration diagrams of FIG. 23B and FIG. 23C, focal length variations of three representative wavelengths in an entire field of view fall within a range of ±0.08 mm. A distortion aberration diagram of FIG. 23D shows that distortion aberrations of the fifth embodiment are retained within a range of ±7%.

Based on the above, it can be seen that the HFOV in the fifth embodiment is greater than the HFOV in the first embodiment. Therefore, compared with the first embodiment, the fifth embodiment has a larger image receiving angle. In addition, the longitudinal spherical aberrations of the fifth embodiment are less than the longitudinal spherical aberrations of the first embodiment, and the distortion aberrations of the fifth embodiment are less than the distortion aberrations of the first embodiment.

Figure 26:
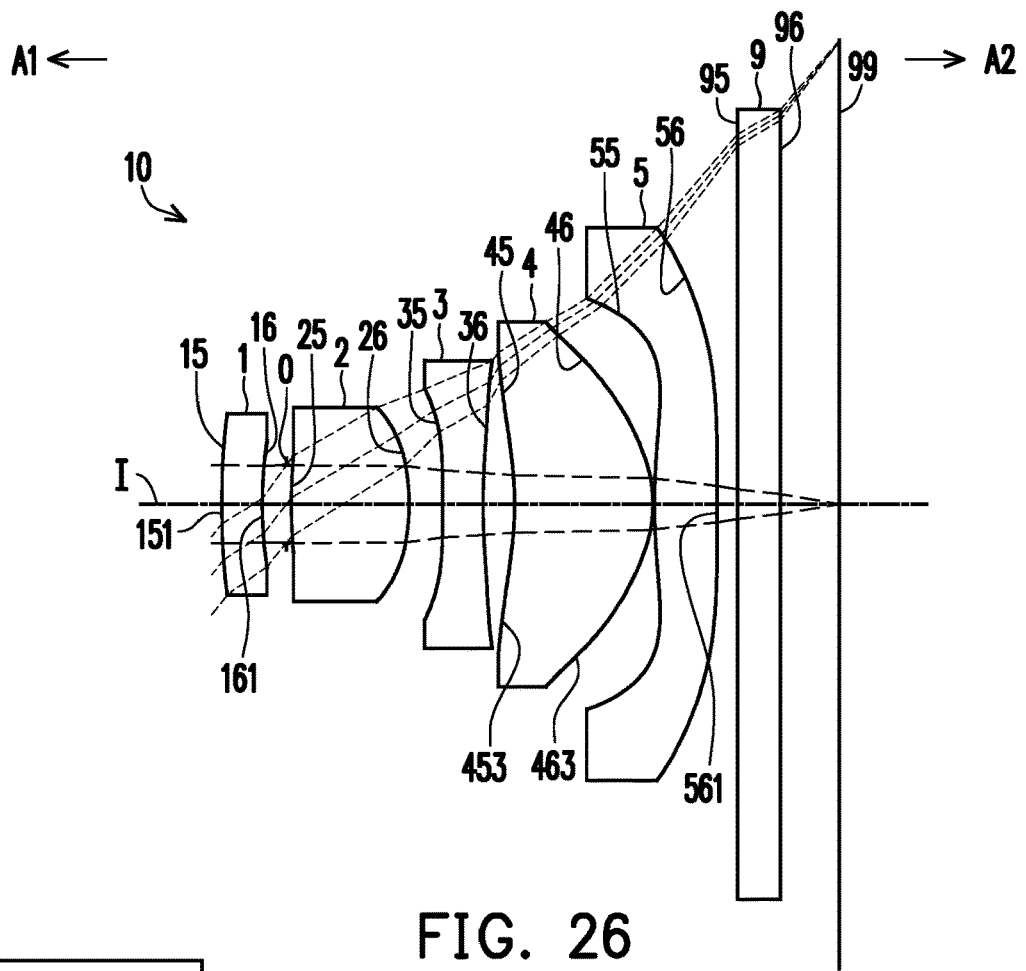
FIG. 26 is a schematic diagram of an optical imaging lens according to a sixth embodiment of the disclosure.

FIG. 26 is a schematic diagram of an optical imaging lens according to a sixth embodiment of the disclosure. FIG. 27A to FIG. 27D are diagrams of longitudinal spherical aberrations and astigmatic aberrations of the optical imaging lens according to the sixth embodiment. Referring to FIG. 26 first, the sixth embodiment of the optical imaging lens 10 of the disclosure is basically similar to the first embodiment, which differ as follows: the fourth lens element 4 has a different Abbe number (the Abbe number V4 of the fourth lens element 4 in the sixth embodiment is 37.490, while the Abbe number V4 of the fourth lens element 4 in the first embodiment is 55.690), the fifth lens element 5 has a different Abbe number (the Abbe number V5 of the fifth lens element 5 in the sixth embodiment is 49.620, while the Abbe number V5 of the fifth lens element 5 in the first embodiment is 37.490), and optical data, aspheric surface coefficients, and parameters between the lens elements 1, 2, 3, 4, and 5 are different to some extent. In addition, in the present embodiment, the optical axis region 151 of the object-side surface 15 of the first lens element 1 is convex. The optical axis region 161 of the image-side surface 16 of the first lens element 1 is concave. The periphery region 453 of the object-side surface 45 of the fourth lens element 4 is concave. The periphery region 463 of the image-side surface 46 of the fourth lens element 4 is convex. The fifth lens element 5 has positive refracting power. The optical axis region 561 of the image-side surface 56 of the fifth lens element 5 is convex. Herein, it should be noted that, for clearly presenting the diagram, same reference numbers of optical axis regions and periphery regions in the two embodiments are omitted in FIG. 26.

Detailed optical data of the optical imaging lens 10 in the sixth embodiment is shown in FIG. 28, and the optical imaging lens 10 in the sixth embodiment has an EFL of 1.059 mm, an HFOV of 51.995°, a Fno of 2.734, a TTL of 3.064 mm, and an image height of 2.297 mm.

Aspheric surface coefficients of the object-side surface 15 of the first lens element 1 to the image-side surface 56 of the fifth lens element 5 in the sixth embodiment in Formula (1) are shown in FIG. 29.

In addition, a relationship between important parameters of the optical imaging lens 10 in the sixth embodiment is shown in FIG. 44 and FIG. 45.

Figures 27A, 27B, 27C, 27D:
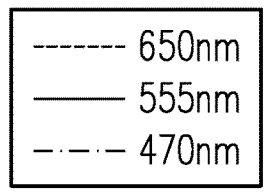
FIG. 27A to FIG. 27D are diagrams of longitudinal spherical aberrations and astigmatic aberrations of the optical imaging lens according to the sixth embodiment.

Longitudinal spherical aberrations of the sixth embodiment are shown in FIG. 27A, and imaging point deviations of off-axis rays at different heights are controlled within a range of ±0.016 mm. In two field curvature aberration diagrams of FIG. 27B and FIG. 27C, focal length variations of three representative wavelengths in an entire field of view fall within a range of ±0.40 mm. A distortion aberration diagram of FIG. 27D shows that distortion aberrations of the sixth embodiment are retained within a range of ±70%.

Based on the above, it can be seen that the HFOV in the sixth embodiment is greater than the HFOV in the first embodiment. Therefore, compared with the first embodiment, the sixth embodiment has a larger image receiving angle. In addition, the TTL in the sixth embodiment is less than the TTL in the first embodiment.

FIG. 30 is a schematic diagram of an optical imaging lens according to a seventh embodiment of the disclosure. FIG. 31A to FIG. 31D are diagrams of longitudinal spherical aberrations and astigmatic aberrations of the optical imaging lens according to the seventh embodiment. Referring to FIG. 30 first, the seventh embodiment of the optical imaging lens 10 of the disclosure is basically similar to the first embodiment, which differ as follows: the fifth lens element 5 has a different Abbe number (the Abbe number V5 of the fifth lens element 5 in the seventh embodiment is 23.529, while the Abbe number V5 of the fifth lens element 5 in the first embodiment is 37.490), and optical data, aspheric surface coefficients, and parameters between the lens elements 1, 2, 3, 4, and 5 are different to some extent. In addition, in the present embodiment, the optical axis region 151 of the object-side surface 15 of the first lens element 1 is convex. The optical axis region 161 of the image-side surface 16 of the first lens element 1 is concave. The periphery region 463 of the image-side surface 46 of the fourth lens element 4 is convex. Herein, it should be noted that, for clearly presenting the diagram, same reference numbers of optical axis regions and periphery regions in the two embodiments are omitted in FIG. 30.

Detailed optical data of the optical imaging lens 10 in the seventh embodiment is shown in FIG. 32, and the optical imaging lens 10 in the seventh embodiment has an EFL of 2.175 mm, an HFOV of 52.528°, a Fno of 2.621, a TTL of 3.844 mm, and an image height of 2.297 mm.

Aspheric surface coefficients of the object-side surface 15 of the first lens element 1 to the image-side surface 56 of the fifth lens element 5 in the seventh embodiment in Formula (1) are shown in FIG. 33.

In addition, a relationship between important parameters of the optical imaging lens 10 in the seventh embodiment is shown in FIG. 44 and FIG. 45.

Longitudinal spherical aberrations of the seventh embodiment are shown in FIG. 31A, and imaging point deviations of off-axis rays at different heights are controlled within a range of ±0.025 mm. In two field curvature aberration diagrams of FIG. 31B and FIG. 31C, focal length variations of three representative wavelengths in an entire field of view fall within a range of ±0.10 mm. A distortion aberration diagram of FIG. 31D shows that distortion aberrations of the seventh embodiment are retained within a range of ±20%.

Based on the above, it can be seen that the HFOV in the seventh embodiment is greater than the HFOV in the first embodiment. Therefore, compared with the first embodiment, the seventh embodiment has a larger image receiving angle.

FIG. 34 is a schematic diagram of an optical imaging lens according to an eighth embodiment of the disclosure. FIG. 35A to FIG. 35D are diagrams of longitudinal spherical aberrations and astigmatic aberrations of the optical imaging lens according to the eighth embodiment. Referring to FIG. 34 first, the eighth embodiment of the optical imaging lens 10 of the disclosure is basically similar to the first embodiment, which differ as follows: the fifth lens element 5 has a different Abbe number (the Abbe number V5 of the fifth lens element 5 in the eighth embodiment is 23.529, while the Abbe number V5 of the fifth lens element 5 in the first embodiment is 37.490), and optical data, aspheric surface coefficients, and parameters between the lens elements 1, 2, 3, 4, and 5 are different to some extent. In addition, in the present embodiment, the optical axis region 151 of the object-side surface 15 of the first lens element 1 is convex, and the periphery region 153 of the object-side surface 15 of the first lens element 1 is concave. The optical axis region 161 of the image-side surface 16 of the first lens element 1 is concave. The periphery region 453 of the object-side surface 45 of the fourth lens element 4 is concave. The periphery region 463 of the image-side surface 46 of the fourth lens element 4 is convex. Herein, it should be noted that, for clearly presenting the diagram, same reference numbers of optical axis regions and periphery regions in the two embodiments are omitted in FIG. 34.

Detailed optical data of the optical imaging lens 10 in the eighth embodiment is shown in FIG. 36, and the optical imaging lens 10 in the eighth embodiment has an EFL of 2.028 mm, an HFOV of 53.099°, a Fno of 2.113, a TTL of 3.792 mm, and an image height of 2.297 mm.

Aspheric surface coefficients of the object-side surface 15 of the first lens element 1 to the image-side surface 56 of the fifth lens element 5 in the eighth embodiment in Formula (1) are shown in FIG. 37.

In addition, a relationship between important parameters of the optical imaging lens 10 in the eighth embodiment is shown in FIG. 44 and FIG. 45.

Longitudinal spherical aberrations of the eighth embodiment are shown in FIG. 35A, and imaging point deviations of off-axis rays at different heights are controlled within a range of ±0.03 mm. In two field curvature aberration diagrams of FIG. 35B and FIG. 35C, focal length variations of three representative wavelengths in an entire field of view fall within a range of ±0.20 mm. A distortion aberration diagram of FIG. 35D shows that distortion aberrations of the eighth embodiment are retained within a range of ±16%.

Based on the above, it can be seen that the HFOV in the eighth embodiment is greater than the HFOV in the first embodiment. Therefore, compared with the first embodiment, the eighth embodiment has a larger image receiving angle. In addition, the Fno in the eighth embodiment is less than the Fno in the first embodiment.

Figure 38:
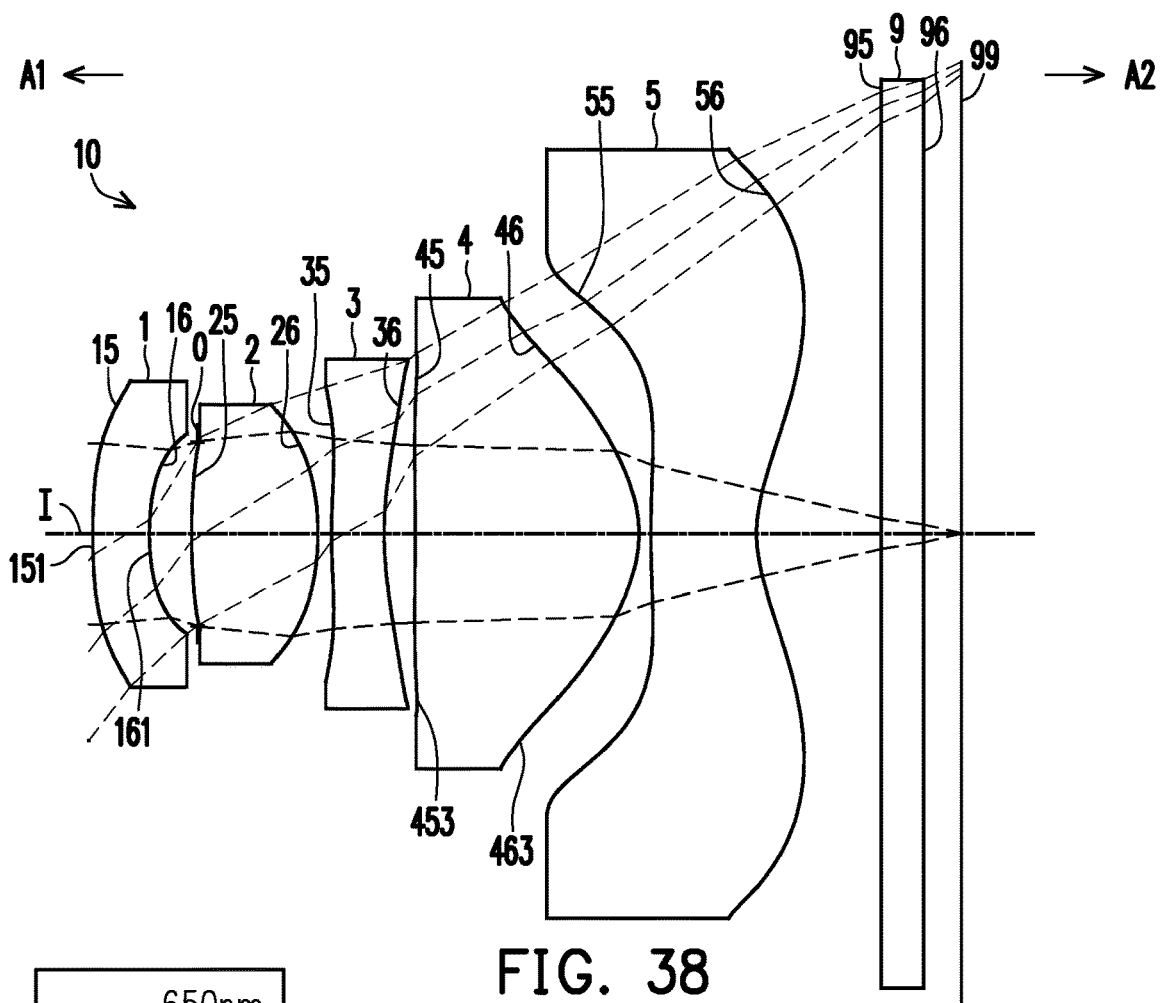
FIG. 38 is a schematic diagram of an optical imaging lens according to a ninth embodiment of the disclosure.

FIG. 38 is a schematic diagram of an optical imaging lens according to a ninth embodiment of the disclosure. FIG. 39A to FIG. 39D are diagrams of longitudinal spherical aberrations and astigmatic aberrations of the optical imaging lens according to the ninth embodiment. Referring to FIG. 38 first, the ninth embodiment of the optical imaging lens 10 of the disclosure is basically similar to the first embodiment, which differ as follows: the fifth lens element 5 has a different Abbe number (the Abbe number V5 of the fifth lens element 5 in the ninth embodiment is 23.529, while the Abbe number V5 of the fifth lens element 5 in the first embodiment is 37.490), and optical data, aspheric surface coefficients, and parameters between the lens elements 1, 2, 3, 4, and 5 are different to some extent. In addition, in the present embodiment, the optical axis region 151 of the object-side surface 15 of the first lens element 1 is convex. The optical axis region 161 of the image-side surface 16 of the first lens element 1 is concave. The periphery region 453 of the object-side surface 45 of the fourth lens element 4 is concave. The periphery region 463 of the image-side surface 46 of the fourth lens element 4 is convex. Herein, it should be noted that, for clearly presenting the diagram, same reference numbers of optical axis regions and periphery regions in the two embodiments are omitted in FIG. 38.

Detailed optical data of the optical imaging lens 10 in the ninth embodiment is shown in FIG. 40, and the optical imaging lens 10 in the ninth embodiment has an EFL of 1.977 mm, an HFOV of 52.410°, a Fno of 2.248, a TTL of 4.279 mm, and an image height of 2.297 mm.

Aspheric surface coefficients of the object-side surface 15 of the first lens element 1 to the image-side surface 56 of the fifth lens element 5 in the ninth embodiment in Formula (1) are shown in FIG. 41.

In addition, a relationship between important parameters of the optical imaging lens 10 in the ninth embodiment is shown in FIG. 44 and FIG. 45.

Figure 39A:
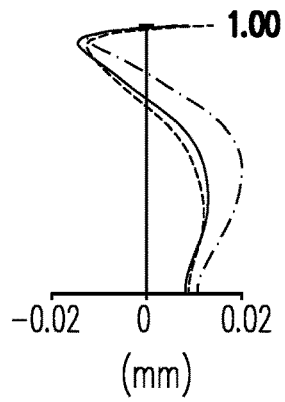
FIG. 39A to FIG. 39D are diagrams of longitudinal spherical aberrations and astigmatic aberrations of the optical imaging lens according to the ninth embodiment.
Figure 39B:
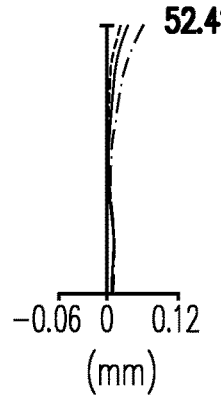
Figure 39C:
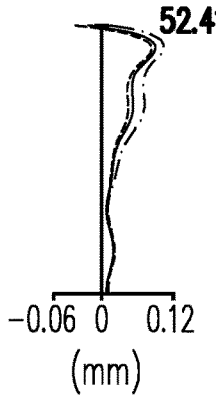
Figure 39D:
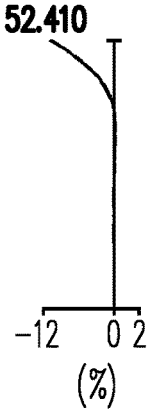

Longitudinal spherical aberrations of the ninth embodiment are shown in FIG. 39A, and imaging point deviations of off-axis rays at different heights are controlled within a range of ±0.02 mm. In two field curvature aberration diagrams of FIG. 39B and FIG. 39C, focal length variations of three representative wavelengths in an entire field of view fall within a range of ±0.12 mm. A distortion aberration diagram of FIG. 39D shows that distortion aberrations of the ninth embodiment are retained within a range of ±12%.

Based on the above, it can be seen that the HFOV in the ninth embodiment is greater than the HFOV in the first embodiment. Therefore, compared with the first embodiment, the ninth embodiment has a larger image receiving angle. In addition, the Fno in the ninth embodiment is less than the Fno in the first embodiment. The distortion aberrations of the ninth embodiment are less than distortion aberrations of the first embodiment.

Further refer to FIG. 42, FIG. 43, FIG. 44, and FIG. 45, which are table diagrams of optical parameters in the first embodiment to the ninth embodiment.

To more effectively help reduce a chromatic aberration for the optical imaging lens 10, the optical imaging lens 10 in the embodiments of the disclosure satisfies the following conditional expression: $V2+V3+V4+V5 \leq 170.000$. An exemplary range is $150.000 \leq V2+V3+V4+V5 \leq 170.000$.

To effectively reduce the TTL of the optical imaging lens 10, the optical imaging lens 10 in the embodiments of the disclosure satisfies the following conditional expression: $(T2+T4)/(T1+G12) \geq 2.900$. A preferable range is $2.900 \leq (T2+T4)/(T1+G12) \leq 4.200$.

To effectively increase the luminous flux and expand the field of view, the optical imaging lens 10 in the embodiments of the disclosure satisfies the following conditional expression: $HFOV/Fno \geq 19.000°$. A preferable range is $19.000° \leq HFOV/Fno \leq 25.500°$.

To reduce the TTL of the lens and ensure imaging quality, reducing an air gap between lens elements or properly reducing a thickness of a lens element is also encompassed in the disclosure. However, considering the difficulty in manufacturing, exemplary configurations may be implemented through limitation by numerical values of the following conditional expressions.

The optical imaging lens 10 in the embodiments of the disclosure further satisfies the following conditional expression: $(T4+T5)/T1 \geq 4.900$. A preferable range is $4.900 \leq (T4+T5)/T1 \leq 5.900$.

The optical imaging lens 10 in the embodiments of the disclosure further satisfies the following conditional expression: $BFL/(T3+G34) \geq 1.700$. A preferable range is $1.700 \leq BFL/(T3+G34) \leq 2.600$.

The optical imaging lens 10 in the embodiments of the disclosure further satisfies the following conditional expression: $ALT/(T1+G23+T3) \geq 3.500$. A preferable range is $3.500 \leq ALT/(T1+G23+T3) \leq 4.700$.

The optical imaging lens 10 in the embodiments of the disclosure further satisfies the following conditional expression: $EFL/(T2+G45) \leq 3.500$. A preferable range is $1.500 \leq EFL/(T2+G45) \leq 3.500$.

The optical imaging lens 10 in the embodiments of the disclosure further satisfies the following conditional expression: $(BFL+AAG)/(T4+G45) \leq 2.100$. A preferable range is $1.100 \leq (BFL+AAG)/(T4+G45) \leq 2.100$.

The optical imaging lens 10 in the embodiments of the disclosure further satisfies the following conditional expression: $TL/BFL \leq 4.100$. A preferable range is $2.300 \leq TL/BFL \leq 4.100$.

The optical imaging lens 10 in the embodiments of the disclosure further satisfies the following conditional expression: $ALT/AAG \geq 3.800$. A preferable range is $3.800 \leq ALT/AAG \leq 5.800$.

The optical imaging lens 10 in the embodiments of the disclosure further satisfies the following conditional expression: $TTL/(T1+G12+T2) \leq 4.400$. A preferable range is $3.100 \leq TTL/(T1+G12+T2) \leq 4.400$.

The optical imaging lens 10 in the embodiments of the disclosure further satisfies the following conditional expression: $(T3+AAG)/T5 \leq 2.500$. A preferable range is $1.100 \leq (T3+AAG)/T5 \leq 2.500$.

The optical imaging lens 10 in the embodiments of the disclosure further satisfies the following conditional expression: $(T3+T4)/T1 \geq 4.000$. A preferable range is $4.000 \leq (T3+T4)/T1 \leq 5.000$.

The optical imaging lens 10 in the embodiments of the disclosure further satisfies the following conditional expression: $ALT/(G34+T5) \geq 3.200$. A preferable range is $3.200 \leq ALT/(G34+T5) \leq 4.700$.

The optical imaging lens 10 in the embodiments of the disclosure further satisfies the following conditional expression: $EFL/(G12+T4) \leq 2.600$. A preferable range is $1.100 \leq EFL/(G12+T4) \leq 2.600$.

The optical imaging lens 10 in the embodiments of the disclosure further satisfies the following conditional expression: $AAG/(G12+G23) \leq 3.200$. A preferable range is $1.400 \leq AAG/(G12+G23) \leq 3.200$.

The optical imaging lens 10 in the embodiments of the disclosure further satisfies the following conditional expression: $T2/(T3+G45) \geq 1.300$. A preferable range is $1.300 \leq T2/(T3+G45) \leq 2.900$.

The optical imaging lens 10 in the embodiments of the disclosure further satisfies the following conditional expression: $(G23+ALT)/T4 \leq 3.200$. A preferable range is $2.400 \leq (G23+ALT)/T4 \leq 3.200$.

The optical imaging lens 10 in the embodiments of the disclosure further satisfies the following conditional expression: $(T3+T4)/AAG \geq 1.700$. A preferable range is $1.700 \leq (T3+T4)/AAG \leq 2.900$.

In addition, the parameters in the embodiments may be selected and combined in any way to impose more lens limitations to facilitate design of a lens having the same architecture as the disclosure. In view of the unpredictability of optical system design, in the architecture of the disclosure, by satisfying the conditional expressions, the optical imaging lens in the embodiments of the disclosure exemplarily can have a depth reduced, an available aperture enlarged, and imaging quality improved, and occupy a smaller area when arranged in a photographing apparatus, or can have an assembly yield improved to overcome a prior-art disadvantage.

The exemplary limitative relational expressions listed above may also be selectively combined in different quantities for application in the embodiments of the disclosure, and the disclosure is not limited thereto. In implementation of the disclosure, in addition to the relational expressions, more detailed structures such as concave-convex surface arrangement of lens elements may be additionally designed for a single lens or a plurality of general lenses to enhance system performance and/or resolution control. It should be noted that such details need to be selectively combined and applied to other embodiments of the disclosure without conflict.

Based on the above, the optical imaging lens 10 in the embodiments of the disclosure can achieve the following effects and advantages:

1. Longitudinal spherical aberrations, astigmatic aberrations, distortions in the embodiments of the disclosure are in compliance with usage specifications. In addition, off-axis rays of the three representative wavelengths of red, green, and blue at different heights are focused near an imaging point, and from deflection amplitude of each curve, it can be seen that imaging point deviations of the off-axis rays at different heights are controlled to achieve a desired spherical aberration, astigmatic aberration, and distortion suppression capability. Further, referring to imaging quality data, the three representative wavelengths of red, green, and blue are quite close to each other. It indicates that the disclosure can focus rays of different wavelengths well in different circumstances and have an excellent dispersion suppression capability. Based on the above, the disclosure can produce excellent imaging quality through design and collocation of the lens elements.

2. In the optical imaging lens in the embodiments of the disclosure, (a) the first lens element is designed to have negative refracting power, the periphery region of the object-side surface of the third lens element is designed concave, and the periphery region of the image-side surface of the third lens element is designed concave; (b) the periphery region of the image-side surface of the third lens element is designed concave, the fourth lens is designed to have positive refracting power, and a proper lens material is selected so that the optical imaging lens satisfies V2+V3+V4+V5≤170.000; (c) the periphery region of the object-side surface of the third lens element is designed concave, the periphery region of the image-side surface of the third lens element is designed concave, and a proper lens material is selected so that the optical imaging lens satisfies V2+V3+V4+V5≤170.000. Therefore, the optical imaging lens can reduce a spherical aberration and an astigmatic aberration of the optical system and reduce a distortion.

3. In the optical imaging lens in the embodiments of the disclosure, the aperture is disposed between the first lens element and the second lens element. Therefore, while maintaining imaging quality, the optical imaging lens can effectively expand the field of view, so that the optical imaging lens is in a smaller size and occupies a smaller area when arranged in a photographing apparatus.

4. The aspheric design of the lens elements in the embodiments of the disclosure facilitates optimization of image quality.

5. The lens elements in the embodiments of the disclosure are made from a plastic material, which contributes to light weight, and can reduce the weight and costs of the optical imaging lens.

A numerical range including maximum and minimum values that is obtained based on combination and proportional relationships of the optical parameters disclosed in the embodiments of the disclosure may be implemented according thereto.

It will be apparent to those skilled in the art that various modifications and variations can be made to the structure of the disclosure without departing from the scope or spirit of the disclosure. In view of the foregoing, it is intended that the disclosure cover modifications and variations of the disclosure provided they fall within the scope of the following claims and their equivalents.

What is claimed is:

1. An optical imaging lens, sequentially comprising a first lens element, an aperture, a second lens element, a third lens element, a fourth lens element, and a fifth lens element from an object side to an image side along an optical axis, wherein each of the first lens element to the fifth lens element comprises an object-side surface facing the object side and allowing imaging rays to pass through and an image-side surface facing the image side and allowing the imaging rays to pass through, wherein the first lens element has negative refracting power;

an optical axis region of the object-side surface of the second lens element is convex;

a periphery region of the object-side surface of the third lens element is concave, and a periphery region of the image-side surface of the third lens element is concave; and lens elements having refractive powers in the optical imaging lens are only the first lens element to the fifth lens element, and the optical imaging lens satisfies the following conditional expressions: (T2+T4)/(T1+G12)≥2.900 and ALT/(T1+G23+T3)≥3.500, wherein T1 is a thickness of the first lens element along the optical axis, T2 is a thickness of the second lens element along the optical axis, T3 is a thickness of the third lens element along the optical axis, T4 is a thickness of the fourth lens element along the optical axis, G12 is an air gap between the first lens element and the second lens element along the optical axis, G23 is an air gap between the second lens element and the third lens element along the optical axis, and ALT is a sum of five thicknesses of the first lens element to the fifth lens element along the optical axis.

2. The optical imaging lens according to claim 1, wherein the optical imaging lens further satisfies the following conditional expression: (T4+T5)/T1≥4.900, wherein T5 is a thickness of the fifth lens element along the optical axis.

3. The optical imaging lens according to claim 1, wherein the optical imaging lens further satisfies the following conditional expression: BFL/(T3+G34)≥1.700, wherein BFL is a distance from the image-side surface of the fifth lens element to an image plane along the optical axis, and G34 is an air gap between the third lens element and the fourth lens element along the optical axis.

4. The optical imaging lens according to claim 1, wherein the optical imaging lens further satisfies the following conditional expression: EFL/(T3+G34)≤3.500, wherein EFL is an effective focal length of the optical imaging lens, and G45 is an air gap between the fourth lens element and the fifth lens element along the optical axis.

5. The optical imaging lens according to claim 1, wherein the optical imaging lens further satisfies the following conditional expression: (BFL+AAG)/(T4+G45)≤2.100, wherein BFL is a distance from the image-side surface of the fifth lens element to an image plane along the optical axis, AAG is a sum of four air gaps between the first lens element and the fifth lens element along the optical axis, and G45 is the air gap between the fourth lens element and the fifth lens element along the optical axis.

6. The optical imaging lens according to claim 1, wherein the optical imaging lens further satisfies the following conditional expression: TL/BFL≤4.100, wherein TL is a distance from the object-side surface of the first lens element to the image-side surface of the fifth lens element along the optical axis, and BFL is a distance from the image-side surface of the fifth lens element to an image plane along the optical axis.

7. An optical imaging lens, sequentially comprising a first lens element, an aperture, a second lens element, a third lens element, a fourth lens element, and a fifth lens element from an object side to an image side along an optical axis, wherein each of the first lens element to the fifth lens element comprises an object-side surface facing the object side and allowing imaging rays to pass through and an image-side surface facing the image side and allowing the imaging rays to pass through, wherein
an optical axis region of the object-side surface of the second lens element is convex;
a periphery region of the image-side surface of the third lens element is concave;
the fourth lens element has positive refracting power; and
lens elements having refractive powers in the optical imaging lens are only the first lens element to the fifth lens element, and the optical imaging lens satisfies the following conditional expressions: $(T2+T4)/(T1+G12) > 2.900$, $V2+V3+V4+V5 \leq 170.000$ and $ALT/(T1+G23+T3) \geq 3.500$, wherein T1 is a thickness of the first lens element along the optical axis, T2 is a thickness of the second lens element along the optical axis, T3 is a thickness of the third lens element along the optical axis, T4 is a thickness of the fourth lens element along the optical axis, G12 is an air gap between the first lens element and the second lens element along the optical axis, G23 is an air gap between the second lens element and the third lens element along the optical axis, V2 is an Abbe number of the second lens element, V3 is an Abbe number of the third lens element, V4 is an Abbe number of the fourth lens element, V5 is an Abbe number of the fifth lens element, and ALT is a sum of five thicknesses of the first lens element to the fifth lens element along the optical axis.

8. The optical imaging lens according to claim 7, wherein the optical imaging lens further satisfies the following conditional expression: $ALT/AAG \geq 3.800$, wherein AAG is a sum of four air gaps between the first lens element and the fifth lens element along the optical axis.

9. The optical imaging lens according to claim 7, wherein the optical imaging lens further satisfies the following conditional expression: $TTL/(T1+G12+T2) \leq 4.400$, wherein TTL is a distance from the object-side surface of the first lens element to an image plane along the optical axis.

10. The optical imaging lens according to claim 7, wherein the optical imaging lens further satisfies the following conditional expression: $(T3+AAG)/T5 \leq 2.500$, wherein T5 is a thickness of the fifth lens element along the optical axis, and AAG is a sum of four air gaps between the first lens element and the fifth lens element along the optical axis.

11. The optical imaging lens according to claim 7, wherein the optical imaging lens further satisfies the following conditional expression: $(T3+T4)/T1 \geq 4.000$.

12. The optical imaging lens according to claim 7, wherein the optical imaging lens further satisfies the following conditional expression: $ALT/(G34+T5) \geq 3.200$, wherein G34 is an air gap between the third lens element and the fourth lens element along the optical axis, and T5 is a thickness of the fifth lens element along the optical axis.

13. The optical imaging lens according to claim 7, wherein the optical imaging lens further satisfies the following conditional expression: $EFL/(G12+T4) \leq 2.600$, wherein EFL is an effective focal length of the optical imaging lens.

14. An optical imaging lens, sequentially comprising a first lens element, an aperture, a second lens element, a third lens element, a fourth lens element, and a fifth lens element from an object side to an image side along an optical axis, wherein each of the first lens element to the fifth lens element comprises an object-side surface facing the object side and allowing imaging rays to pass through and an image-side surface facing the image side and allowing the imaging rays to pass through, wherein
an optical axis region of the object-side surface of the second lens element is convex;
a periphery region of the object-side surface of the third lens element is concave, and a periphery region of the image-side surface of the third lens element is concave; and
lens elements having refractive powers in the optical imaging lens are only the first lens element to the fifth lens element, and the optical imaging lens satisfies the following conditional expressions: $(T2+T4)/(T1+G12) \geq 2.900$, $V2+V3+V4+V5 \leq 170.000$ and $ALT/(T1+G23+T3) > 3.500$, wherein T1 is a thickness of the first lens element along the optical axis, T2 is a thickness of the second lens element along the optical axis, T3 is a thickness of the third lens element along the optical axis, T4 is a thickness of the fourth lens element along the optical axis, G12 is an air gap between the first lens element and the second lens element along the optical axis, G23 is an air gap between the second lens element and the third lens element along the optical axis, V2 is an Abbe number of the second lens element, V3 is an Abbe number of the third lens element, V4 is an Abbe number of the fourth lens element, V5 is an Abbe number of the fifth lens element, and ALT is a sum of five thicknesses of the first lens element to the fifth lens element along the optical axis.

15. The optical imaging lens according to claim 14, wherein the optical imaging lens further satisfies the following conditional expression: $HFOV/Fno \geq 19.000°$, wherein HFOV is a half field of view of the optical imaging lens, and Fno is a F-number of the optical imaging lens.

16. The optical imaging lens according to claim 14, wherein the optical imaging lens further satisfies the following conditional expression: $AAG/(G12+G23) \leq 3.200$, wherein AAG is a sum of four air gaps between the first lens element and the fifth lens element along the optical axis.

17. The optical imaging lens according to claim 14, wherein the optical imaging lens further satisfies the following conditional expression: $T2/(T3+G45) > 1.300$, wherein G45 is an air gap between the fourth lens element and the fifth lens element along the optical axis.

18. The optical imaging lens according to claim 14, wherein the optical imaging lens further satisfies the following conditional expression: $(G23+ALT)/T4 \leq 3.200$.

19. The optical imaging lens according to claim 14, wherein the optical imaging lens further satisfies the following conditional expression: $(T3+T4)/AAG \geq 1.700$, wherein AAG is a sum of four air gaps between the first lens element and the fifth lens element along the optical axis.

* * * * *